(12) United States Patent
Beyrouti

(10) Patent No.: US 7,164,809 B2
(45) Date of Patent: Jan. 16, 2007

(54) IMAGE PROCESSING

(75) Inventor: Fadi Beyrouti, Montreal (CA)

(73) Assignee: Autodesk Canada Co., Montreal (CA)

( * ) Notice: Subject to any disclaimer, the term of this patent is extended or adjusted under 35 U.S.C. 154(b) by 812 days.

(21) Appl. No.: 10/353,617

(22) Filed: Jan. 29, 2003

(65) Prior Publication Data

US 2004/0091175 A1  May 13, 2004

(30) Foreign Application Priority Data

Nov. 12, 2002 (GB) .................................. 0226294

(51) Int. Cl.
*G06K 9/54* (2006.01)
*G06F 15/167* (2006.01)

(52) U.S. Cl. ...................... 382/305; 709/213

(58) Field of Classification Search ............... 382/305, 382/307; 709/213, 239; 386/52; 358/1.17; 345/156, 501, 545; 707/200

See application file for complete search history.

(56) References Cited

U.S. PATENT DOCUMENTS

| | | | | |
|---|---|---|---|---|
| 5,822,524 A * | 10/1998 | Chen et al. | .................. | 709/203 |
| 6,542,692 B1 * | 4/2003 | Houskeeper | .................. | 386/52 |
| 6,981,057 B1 * | 12/2005 | Theriault et al. | ........... | 709/239 |
| 7,028,329 B1 * | 4/2006 | Mizutani | .................... | 725/109 |
| 7,054,911 B1 * | 5/2006 | Lango et al. | ................ | 709/213 |

* cited by examiner

*Primary Examiner*—Kanjibhai Patel
(74) *Attorney, Agent, or Firm*—Gates & Cooper LLP

(57) ABSTRACT

A method of writing image data files to frame storage means, implemented as an array of disks, on which image data is stored as contiguous clips of frames. A remote system transmits a plurality of data packets over a network in any order, the data packets constituting a plurality of image data files. A local system connected to the frame storage means receives the data packets from the remote system and stores them in a buffer so as to arrange the image data files in a display sequence order. The local system then writes the image data files to the frame storage means as a contiguous clip of frames.

38 Claims, 33 Drawing Sheets

| FRAME ID | POSITION | EFFECTS |
|---|---|---|
| 010410321 | 0001 | |
| 010410322 | 0002 | |
| 010410323 | 0003 | |
| . . . | . . . | |
| 010410497 | 0157 | |

1101 — FRAME ID
1102 — POSITION
1103 — EFFECTS
1104

*Figure 11*

| FRAME ID | LOCATION | SIZE | TIMESTAMP |
|---|---|---|---|
| 0104103210 | 043129 | 1000322 | 37567.61666 |
| 0104103220 | 012196 | 1000322 | 37567.61666 |
| 0104103230 | 438721 | 1000322 | 37567.61666 |
| ... | ... | ... | ... |

*Figure 12*

IMAGE PROCESSING

BACKGROUND OF THE INVENTION

1. Field of the Invention

The present invention relates to the storage of conventional image files on a frame-based storage system.

2. Description of the Related Art

Image processing environments are known in which specialised image processing systems each control a disk array for the storage of frames of image data, known as a framestore. A framestore, together with the hardware or software which controls it, is known as a frame-based storage system. It is a very efficient way of storing image data.

However, in such environments there are often additional processing systems, such as personal computers (PCs) networked to the image processing systems. These are often provided because specialised image processing systems, and the trained persons who use them, are expensive and some tasks can be delegated to less powerful machines. However, processing systems such as PCs may not be able to access the frame-based storage systems because they are formatted in a way that the PCs are unable to understand.

Co-pending U.S. application Ser. No. 09/947,708 discloses a method of presenting the frames stored on a framestore as files within a virtual filesystem. This allows additional processing systems to indirectly access the frame-based storage system to read frames. However, when editing has been completed on these or other images they cannot be saved directly to the frame-based storage system from a PC or similar machine. This necessitates a two-step process of saving the files in a different location and importing them onto a framestore using an image processing system.

There is therefore a need for a way of saving images from a PC or similar machine directly to a frame-based storage system operated by an image processing system, preferably without necessitating changes to the operating system of the PC.

BRIEF SUMMARY OF THE INVENTION

According to a first aspect of the invention, there is provided apparatus comprising processing means, a network interface, a buffer and frame storage means, implemented as an array of disks, on which frames are stored as contiguous clips. The network interface receives a plurality of data packets constituting a plurality of image data files to be stored in the frame storage means. The processing means stores the data packets in the buffering means so as to arrange the image data files in a display sequence order, and writes the ordered image data files to the frame storage means as a contiguous clip of image frames.

According to a second aspect of the invention, there is provided a method of writing image data files to a frame storage means on which image data is stored as contiguous clips of frames. A remote system transmits a plurality of data packets over a network in any order, wherein the data packets make up a plurality of image data files. A local system connected to the frame storage means receives these data packets from the remote system via the network and stores them in a buffer so as to arrange them in a display sequence order. The local system then writes the image data files to the frame storage means as a contiguous clip of frames.

According to a third aspect of the invention, there is provided a computer system programmed to execute stored instructions such that in response to said stored instructions the system is configured to receive from a network a plurality of data packets constituting a plurality of image data files, store the data packets in a buffer and write the image data files in display-sequence order as a contiguous clip of frames to a frame storage means connected to the computer system.

According to a fourth aspect of the invention there is provided a computer-readable medium having computer-readable instructions executable by a computer such that, when executing said instructions, a computer will perform the steps of receiving from a network a plurality of data packets constituting a plurality of image data files, storing the data packets in a buffer and writing the image data files in display-sequence order as a contiguous clip of frames to a frame storage means connected to the computer system.

BRIEF DESCRIPTION OF THE SEVERAL VIEWS OF THE DRAWINGS

FIG. 11 details a clip file contained in the metadata shown in FIG. 10;

FIG. 12 details location data that logs the physical location of image data on the framestore shown in FIG. 6;

WRITTEN DESCRIPTION OF THE BEST MODE FOR CARRYING OUT THE INVENTION

FIG. 1

Figure 1:
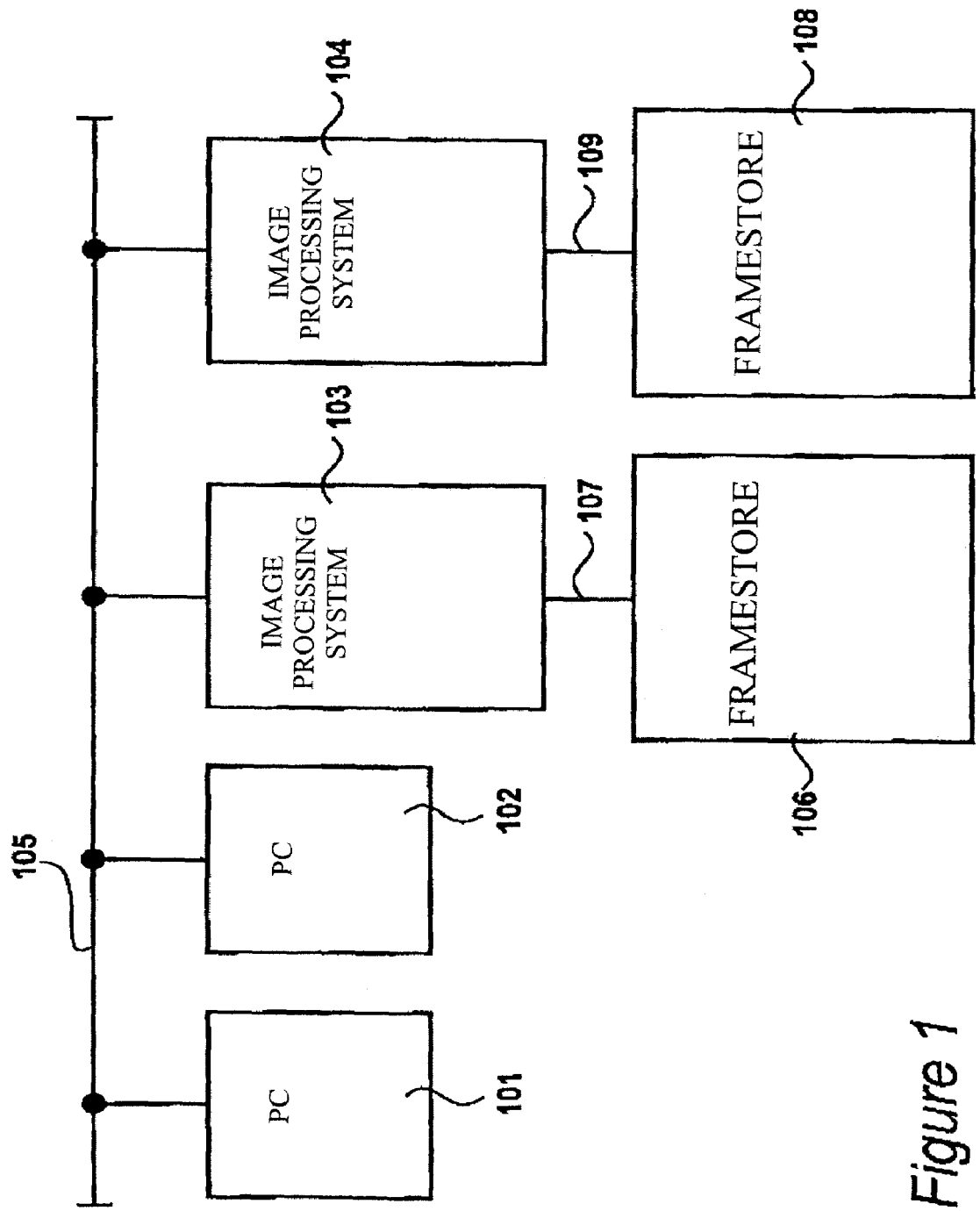
FIG. 1 shows an image processing environment.

FIG. 1 shows an image processing environment. PCs 101 and 102 and image processing systems 103 and 104 are connected to Ethernet network 105. Image processing system 103 is connected to framestore 106 by connection 107, and image processing system 104 is connected to framestore 108 by connection 109 in such an environment, processing systems 103 and 104 perform much of the image processing required. They performs both off-line and on-line editing and are capable of viewing frames in real time (usually about thirty frames per second). However, PCs 101 and 102 can when necessary perform certain offline image processing tasks that do not require the capabilities of an image processing system.

Frames of image data are stored on framestores 106 and 108, in a manner which will be described with reference to FIG. 7. Each framestore is accessed and controlled by its respective image processing system. However, PCs 101 and 102 may view, read from and write to framestore 106 or 107 by sending network commands to the respective processing station over Ethernet network 105.

In such an environment, from the point of view of each image processing system, it itself is the local system and all other processing systems are remote systems. For example, image processing system 103 considers itself to be the local system and image processing system 104 and PCs 101 and 102 to be remote systems. Each image processing system considers its own framestore to be local and any other framestores to be remote. Thus, writing to a remote framestore means writing to a framestore to which a processing system is not directly connected. For example, for PCs 101 and 102 both framestores 106 and 107 are remote.

FIG. 2

Figure 2:
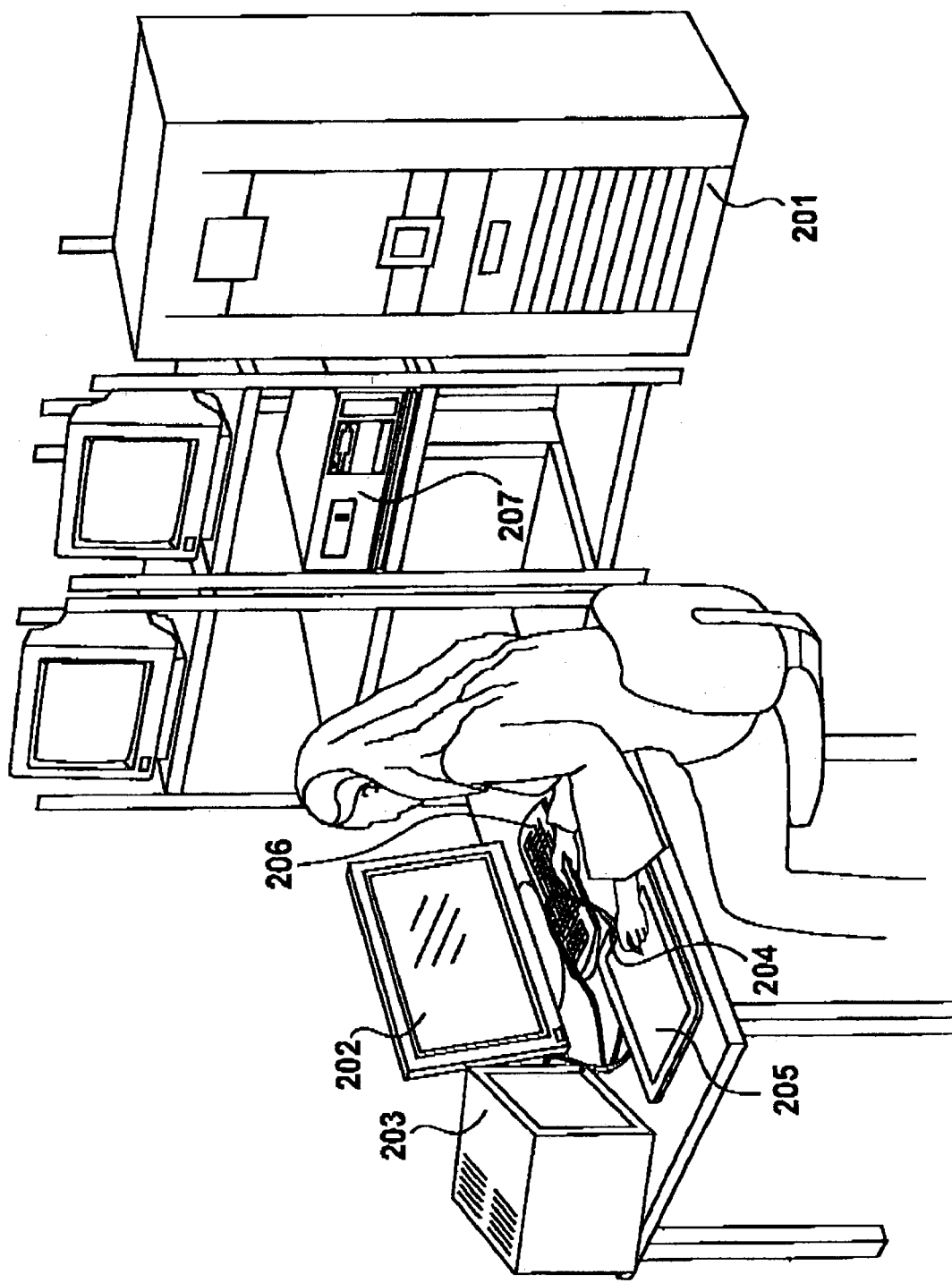
FIG. 2 illustrates an image processing system within the image processing environment shown in FIG. 1.

An image processing system, such as system 103, is shown in FIG. 2. It is based around an Onyx™ II processor 201 which supplies output display data to a visual display unit 202 and a broadcast quality monitor 203. Input commands are generated via a stylus 204 applied to a cut tablet 405 or via keyboard 206. Image data is loaded and recorded via a digital video tape recorder 207.

Image processing systems 103 and 104 are capable of performing many tasks requiring high processing power. In particular, they can view and edit clips of image data, stored as frames, in real time. The operating system and applications executed by image processing systems 103 and 104 are specialised to fit the requirements of on-line and off-line editing of images.

FIG. 3

Figure 3:
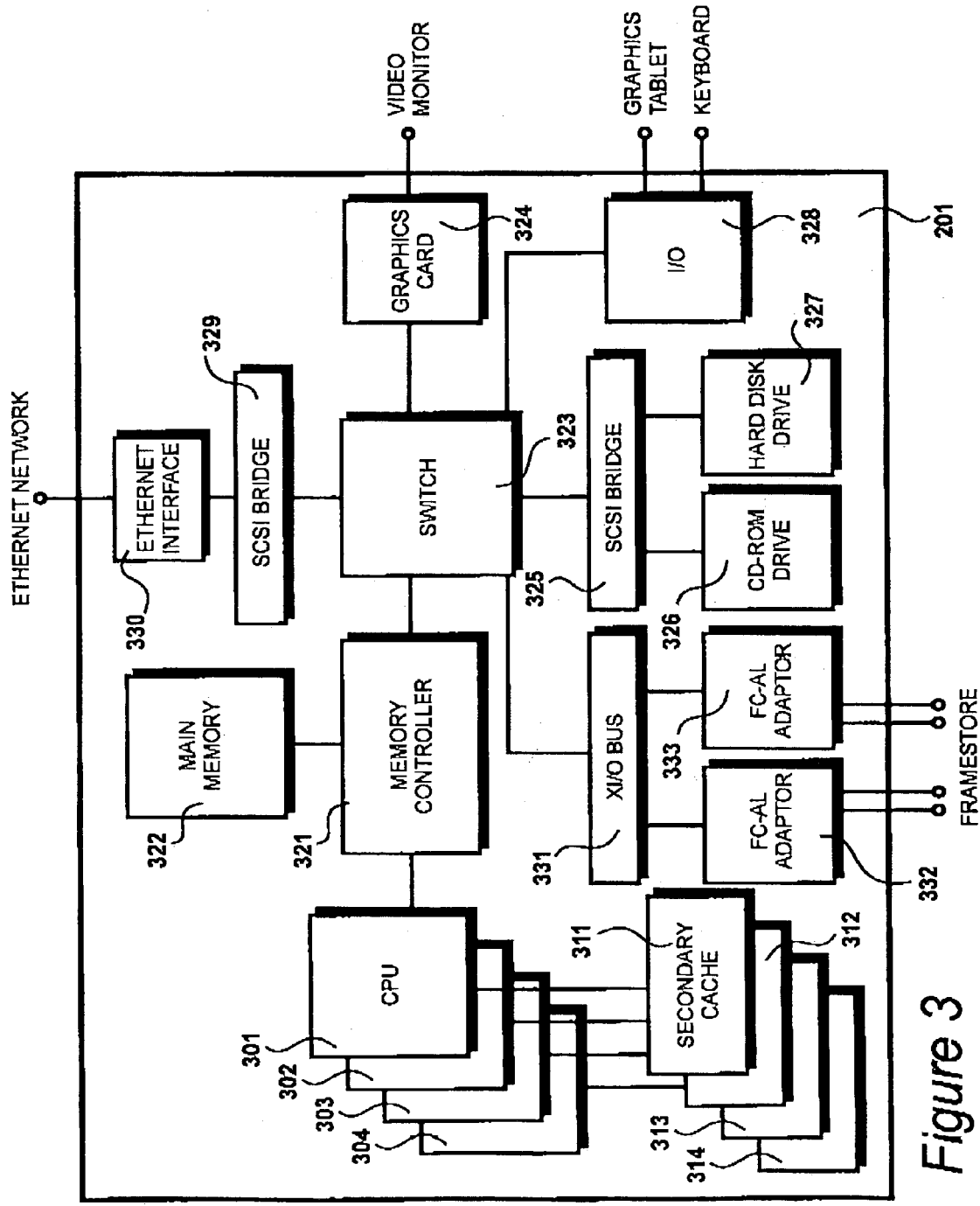
FIG. 3 details a processor forming part of the image processing system illustrated in FIG. 2.

Processor 201 is detailed in FIG. 3. It comprises four central processing units 301, 302, 303 and 304 operating in parallel. Each of these CPUs 301 to 304 has a dedicated secondary cache memory 311, 312, 313 and 314 that facilitate per-CPU storage of frequently used instructions and data. Each CPU 301 to 304 further includes separate primary instruction and data cache memory circuits on the same chip, thereby facilitating a further level of processing improvements. A memory controller 321 provides a common connection between the CPUs 301 to 304 and a main memory 322. Main memory 322 comprises two gigabytes of dynamic RAM.

Memory controller 321 further facilitates connectivity between the aforementioned components of processor 201 and a high, band width non-blocking cross bar switch 323. This switch makes it possible to provide a direct high capacity connection between any of several attach circuits, including a graphics cards 324. Graphics card 324 generally receives instruction from CPU's 301 to 304 to perform various types of graphical image rendering processors, resulting in images, clips and scenes being rendered in real time.

A SCSI bridge 325 facilitates connection between the cross bar switch 323 and a CD ROM drive 326. This provides a convenient way of receiving large quantities of instructions and data, and is typically used to install instructions for processor 201 onto hard disk drive 327. Once installed, instructions located on hard disk 327 may be transferred into main memory 322 and then executed by CPUs 301 to 304. An input/output circuit 328 provides an interface for the graphics tablet 205 and the keyboard 206, through which the user is able to provide instructions to processor 201.

A second SCSI bridge 329 facilitates connection between the cross bar switch 323 and an Ethernet network interface 330 which is connected to ethernet network 105.

An XIO bus 331 facilitates connection between cross bar switch 323 and two fibre channel arbitrated loop (FC-AL) adapters 332 and 333. These are connected to framestore 106.

FIG. 4

Figure 4:
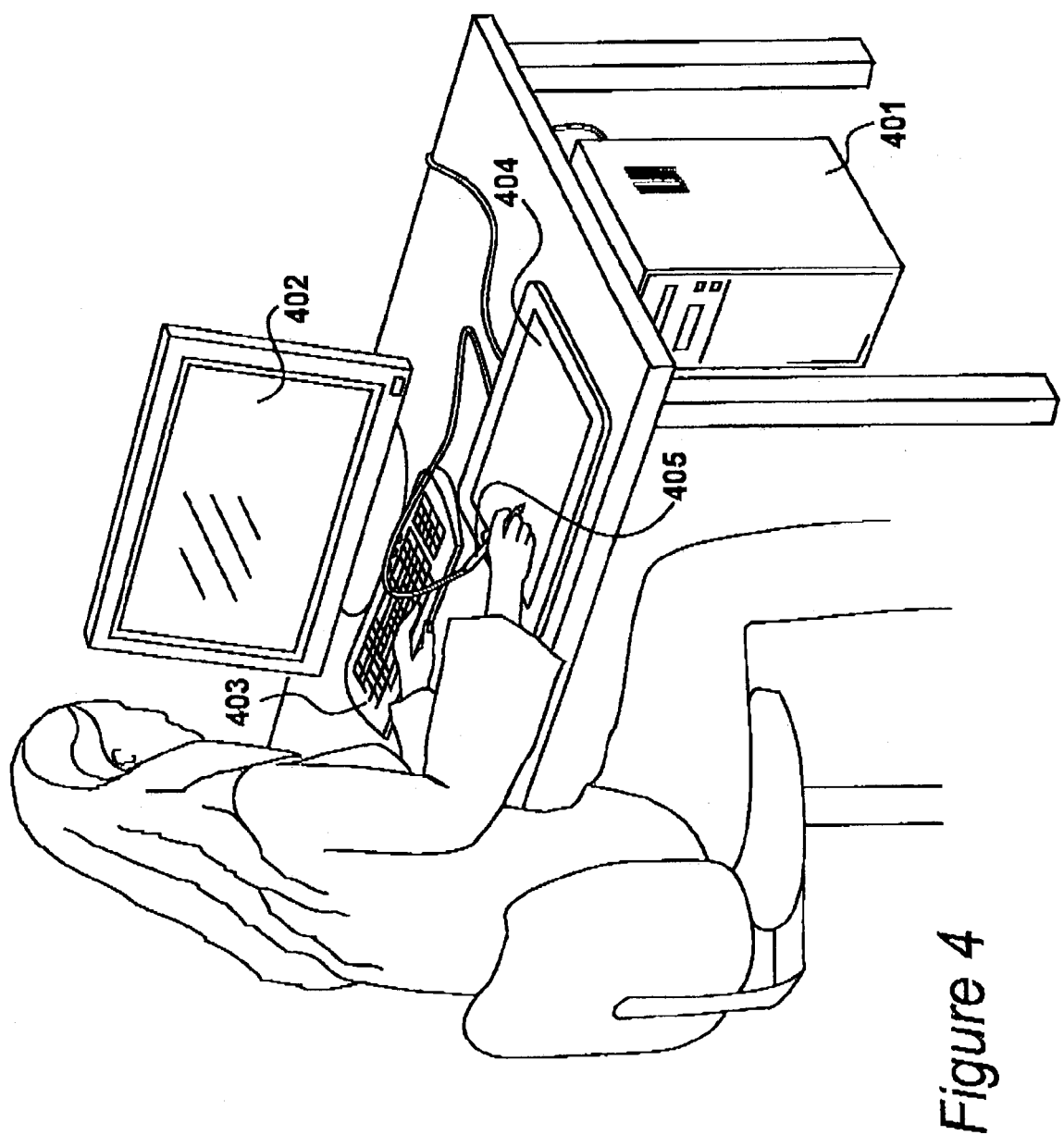
FIG. 4 illustrates a personal computer within the image processing environment shown in FIG. 1.

A PC, such as PC 101, is detailed in FIG. 4. A Pentium™ IV processor 401 provides output display data to a visual display unit 402. Input commands to processor 401 are received by a keyboard 403 and via a touch tablet 404 and stylus 405.

PCs 101 and 102 provide general, unspecialised processing power to the image processing environment shown in FIG. 1. They can be used for administrative tasks such as word processing or for limited image processing tasks, usually using conventional image processing software packages. They are not capable of viewing images in real time and view and edit frames as individual files, rather than as clips of frames. PCs 101 and 102 execute a Microsoft Windows™ operating system.

It will be understood by the skilled person that any conventional computer, for example a Macintosh™, can be substituted for PCs 101 and 102, and the PCs or substitutes may have a different operating system, for example the Macintosh™ operating system or Linux™. The problem solved by the present invention is created by the fact that PCs use a hierarchical file system and are thus unable to interface directly with frame-based storage systems. Since it is standard practice to ensure that most computers, whatever their brand, can interface with each other, most commercially available computers and operating systems also use a hierarchical file system. The problem therefore arises with these computers as well.

FIG. 5

Figure 5:
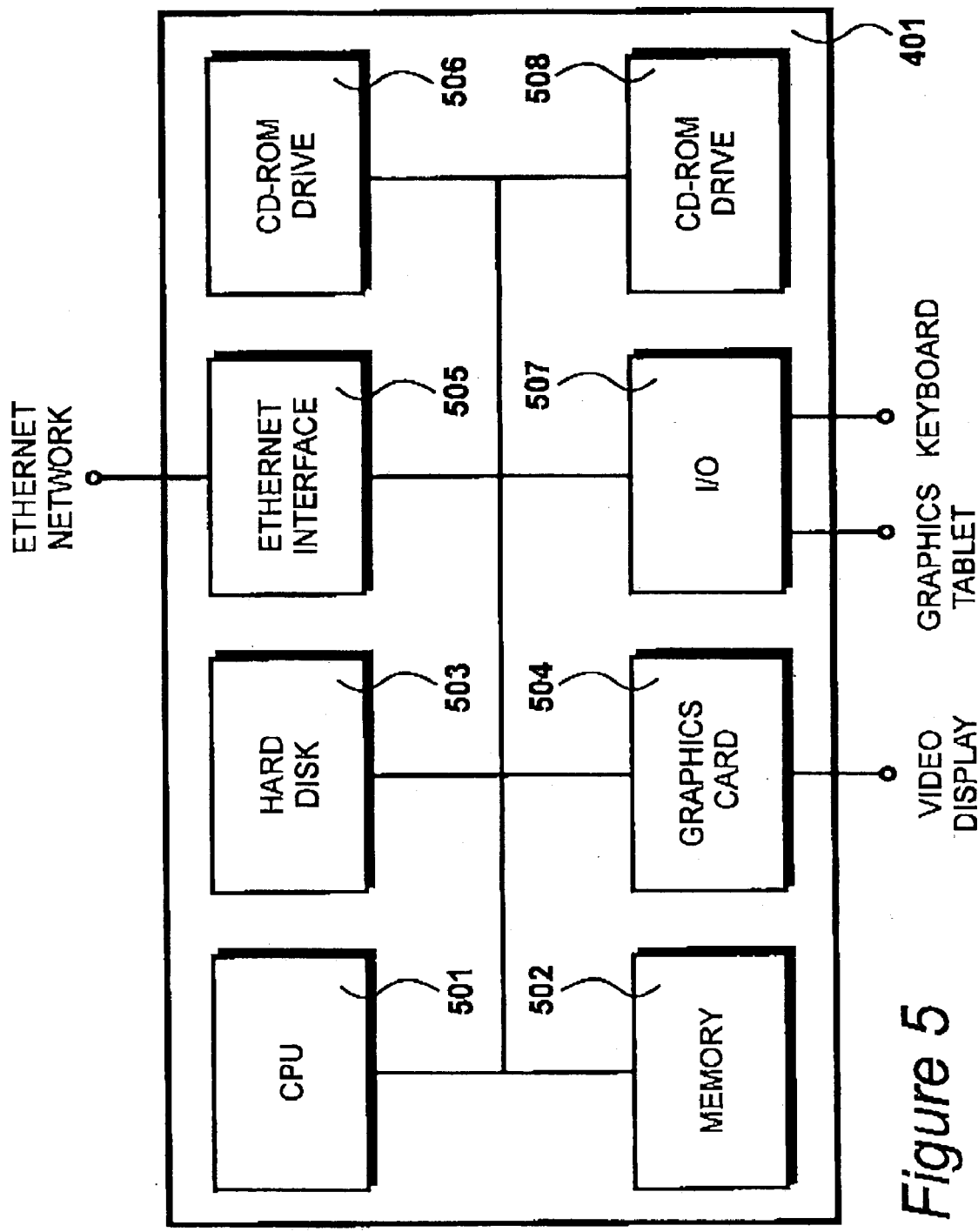
FIG. 5 details a processor forming part of the personal computer illustrated in FIG. 4.

Processor 401 is detailed in FIG. 5. It comprises a central processing unit 501 which is connected via data and address connections to memory 502. A hard disk drive 503 provides non-volatile high capacity storage for programs and data. The graphics card 504 receives commands from CPU 501 resulting in tho update and refresh of images displayed on VDU 402. Ethernet interface 505 enables network communication over Ethernet network 105. A CD-ROM drive 506 is typically used to install instructions for processor 401 onto hard disk 303 input/output circuit 507 provides an interface for graphics tablet 405 and keyboard 403. Floppy disk drive 308 is typically used to transfer small amounts of information, often text files, between the network and other processing systems, although instructions for some applications may be installed via floppy drive 308.

FIG. 6

Figure 6:
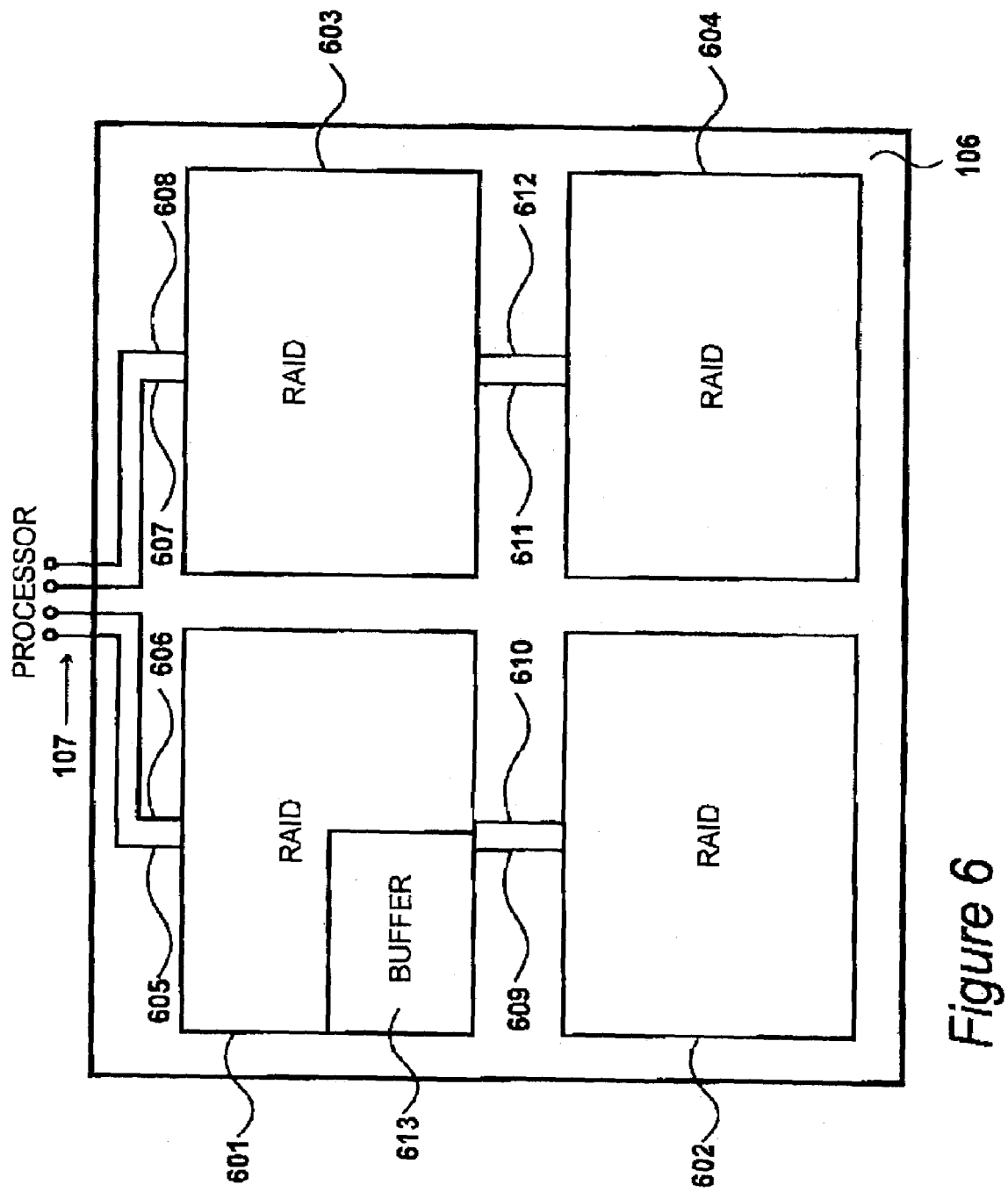
FIG. 6 shows a framestore connected to the image processing system illustrated in FIG. 2.

FIG. 6 shows a framestore, such as framestore 106. It is composed of four redundant arrays of inexpensive disks (RAIDs) 601 to 604. Connection 107 which connects processor 201 of image processing system 103 to framestore 106 comprises four fibre channels 605, 606, 607 and 608. Channels 605 and 606 connect RAID 601 to FC-AL adapter 332, while channels 607 and 608 connect RAID 603 to FC-AL adapter 333. In a manner known as 'daisy-chaining', four further fibre channels connect two further RAIDs. Channels 609 and 610 connect RAID 602 to RAID 601, while channels 611 and 612 connect RAID 604 to RAID 603.

An area of RAID 601 is hard-partitioned off to form buffer 613. Image processing system 103 identifies this partition as a separate storage system that cannot be reconfigured. Buffer 613 remains part of framestore 106 but it is not used for storing data and has no parity disk. It is transparent to applications running on image processing system 103.

A framestore is an example of a frame storage means. In other embodiments (not shown) the frame storage means may be another system capable of storing large amounts of image data which may be accessed in real-time by an editing system.

FIG. 7

Figure 7:
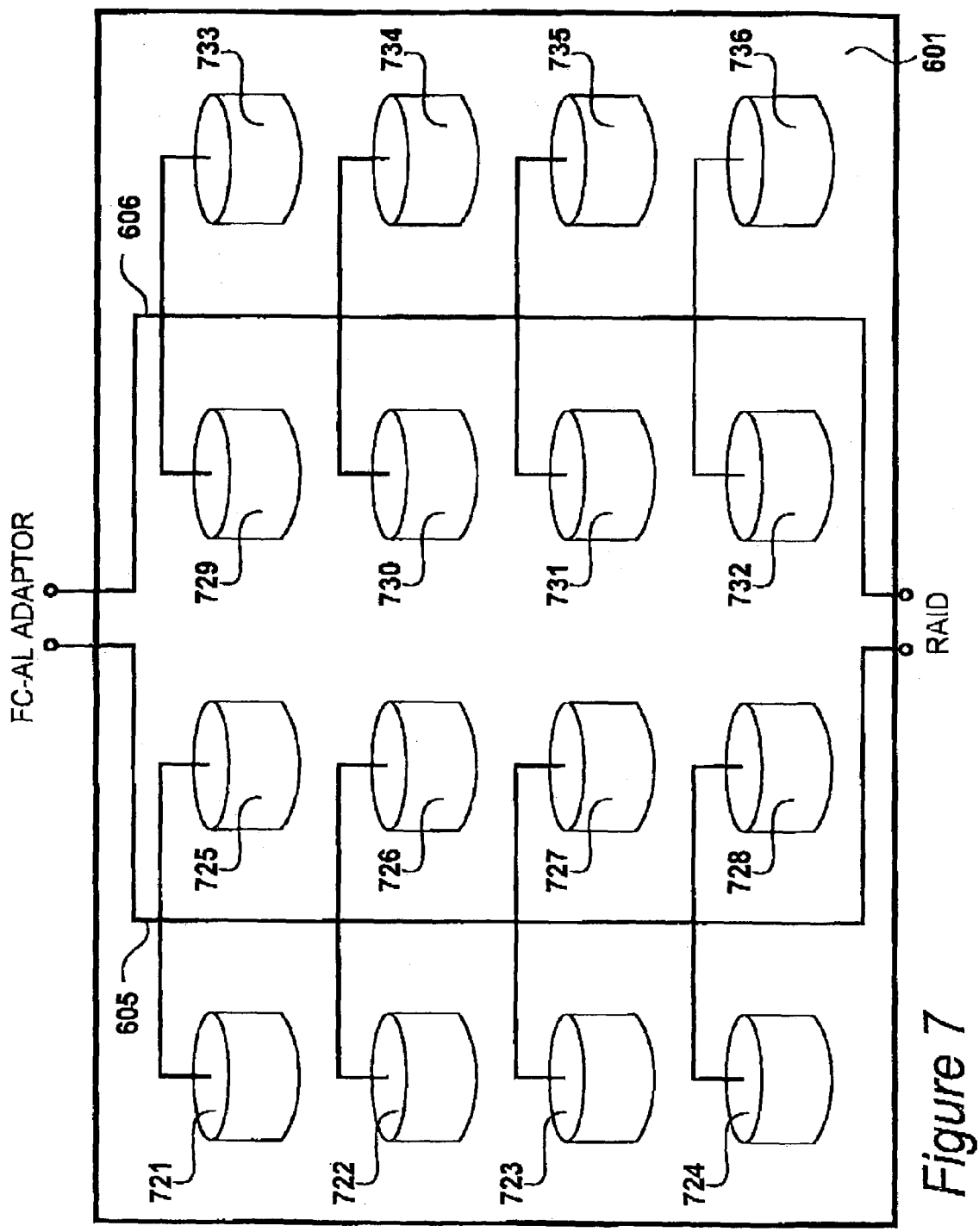
FIG. 7 details a disk array forming part of the framestore shown in FIG. 6.

A RAID, such as RAID 601, is illustrated in FIG. 7. RAID 601 comprises sixteen magnetic disk drives each with a storage capacity of 18 gigabytes. Disks 721 to 728 are connected by fibre channel 605. Similarly, disks 729 to 736 are connected by fibre channel 606. Fibre channels 605 and 606 connect to FC-AL adapter 332 and each has a capacity of one hundred megabytes. Disk 736 is unused and is a spare disk which can be used to replaced a failed disk. Disk 735 is a parity disk which will be further described with reference to FIG. 7. Thus RAID 601 has a total capacity of 252 gigabytes and a bandwidth of eighty-eight megabytes per second.

Fibre channels 609 and 610 of RAID 602 are connected to fibre channels 605 and 606 respectively to daisy-chain the two arrays. Similarly, fibre channels 611 and 612 of RAID 604 are connected to fibre channels 607 and 608 respectively of RAID 603. The four RAIDs are controlled as a single storage system via XIO bus 331. Framestore 106 therefore has a total capacity of 1,116 gigabytes, which is enough to store over an hour of 8-bit film, two hours of high definition television images or over ten hours of NTSC or PAL images. The bandwidth is high enough to allow one stream of high definition television, or two streams of NTSC or PAL, both in real time.

Since each RAID is an array of disks, framestore 106 is therefore also an array of disks, comprising four RAIDs. However, any number of RAIDs, from one upwards, may be used dependent upon hardware and software constraints. Also, other designs of RAID are known which use different numbers of disks, have different ratios of storage disks to parity disks, distribute parity data over all disks or use an additional technique known as mirroring, but all operate on the same principle that parity information is stored to provide backup for the storage disks. The RAIDs in the present invention are controlled by software executed by image processing system 103 but most other designs of RAID include a hardware controller.

Hence, many other embodiments are envisaged in which the framestore is an array of disks comprising any number of any design of RAIDs.

FIG. 7

Framestore 106 is optimised by dividing each image frame into plurality of stripes and then writing each stripe to an individual disk. Thus, for any frame definition and transfer rate a formatting exercise is performed in order to group together an optimal number of individual disk storage devices. In addition, for each RAID a further disk storage device is required for parity data where similar bits within each stripe are exclusive OR-ed (XORed) together to produce a parity stream that is written to the parity disk. In this way the loss of data from any one disk may be reconstituted.

An example of a striping process for a frame being written to framestore 106 is illustrated in FIG. 7. An incoming frame 701 is divided into four stripes, identified as stripe zero, stripe one, stripe two and stripe three. Within image processing system 103 a storage control process 802 runs When writing frames to framestore 106 it performs an XOR operation to generate parity data.

In this example, data is written in parallel to disks 721 to 724 within RAID 601. Thus disk 721 receives data from stripe three, disk 721 receives data from stripe two, disk 723 receives data from stripe one, disk 724 receives data from stripe zero. The parity disk on RAID 601, disk 735, receives the parity data. The addressing of data from the stripes may identify substantially similar locations but with the application of an appropriate offset. Thus, data is read from stripe one at the same location as data being read from stripe zero but with an appropriate off-set as identified by arrow 803. Applications executed by image processing system 103 may access the storage device via storage control process 802.

Figure 8:
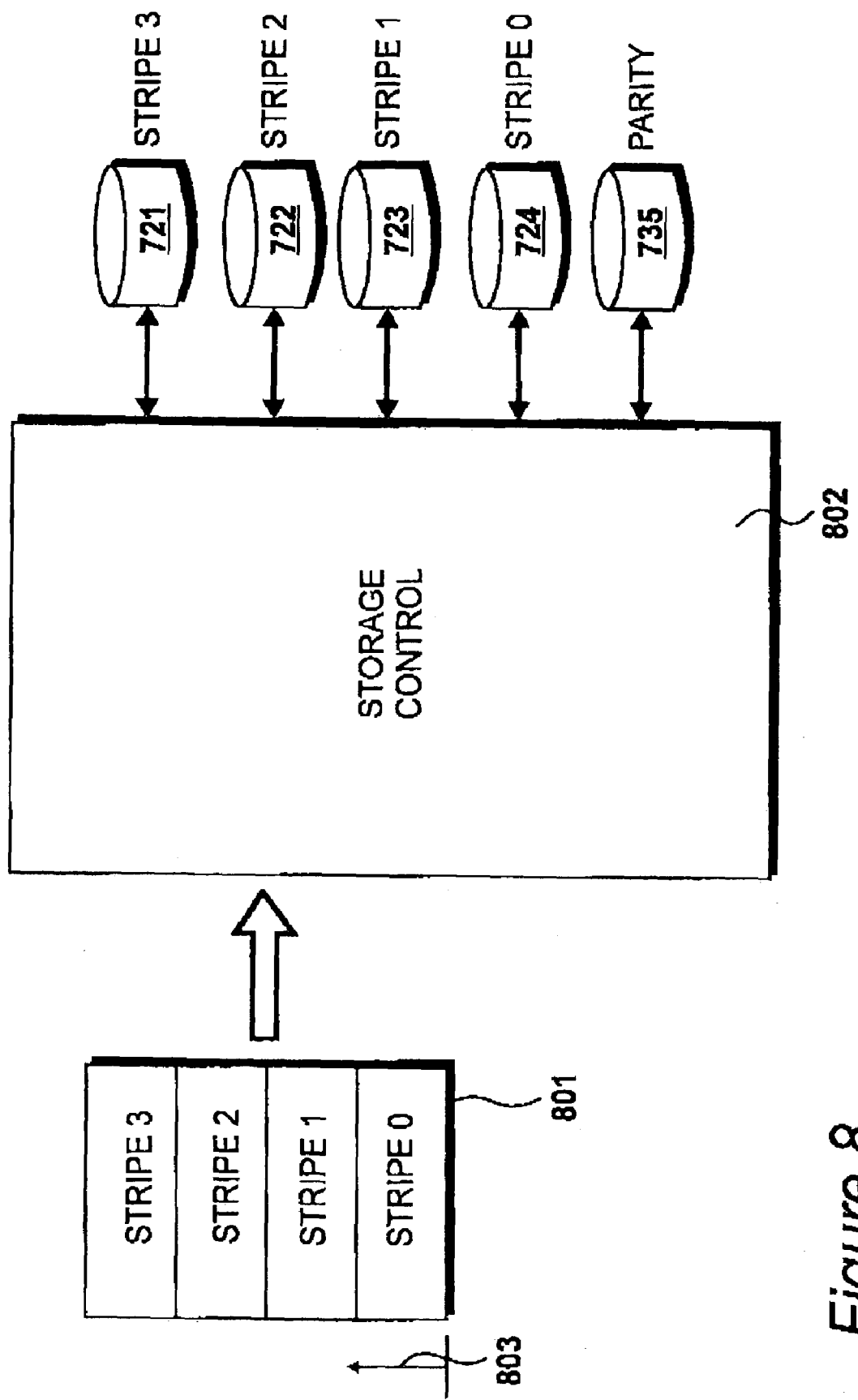
FIG. 8 illustrates a method of writing frames of data to the framestore shown in FIG. 6.

Within a framestore different images of different resolutions may be stored. Having established a system of using a particular number of disks to stripe image frames as shown in FIG. 8, each frame is striped using that number of disks, regardless of resolution. Thus stripes of higher resolution frames, for example HDTV, are larger than those of lower resolution frames, for example NTSC. In other embodiments (not shown), however, the striping can be achieved in different ways. Other methods of using RAIDs include setting up hard partitions such that only a set number of frames of a set resolution can be stored, and setting up soft partitions which function like hard partitions but are allocated dynamically.

FIG. 9

Frames of image data are rarely used individually in an image processing environment such as that illustrated in FIG. 1. Just one second of video or film usually comprises at least twenty-four frames. Hence when a clip of film or video is captured (digitised) to the framestore it is still considered as a whole, rather than as individual frames. However, the allocation of stripes to individual disks is selected in order to optimise the storage and avoid fragmentation, which means that in a frame-based storage system, such as that comprising storage control process 802 and framestore 106, consecutive frames are usually not stored next to each other physically.

Figure 9:
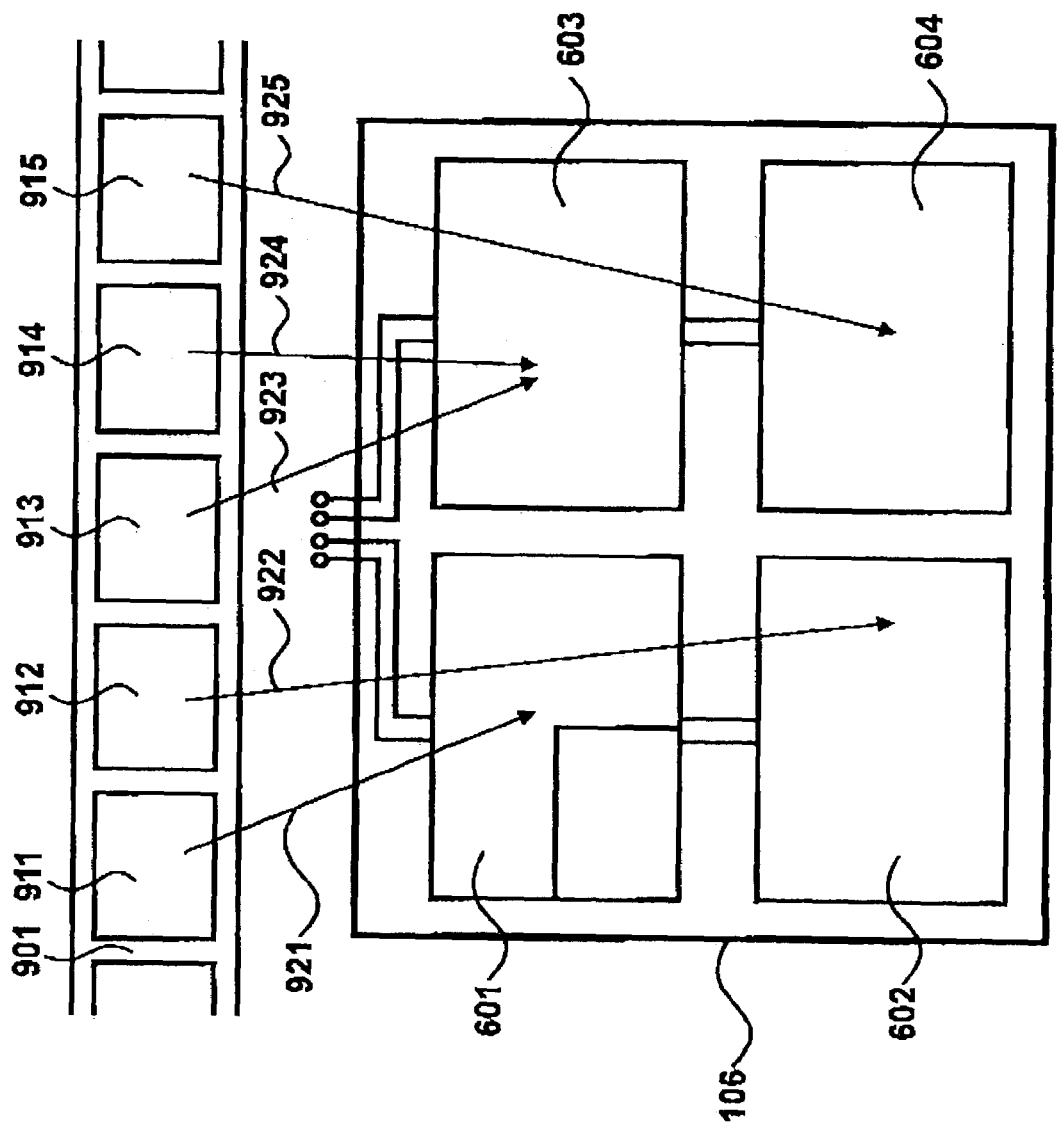
FIG. 9 illustrates how consecutive clips of a frame may be written to different parts of the framestore shown in FIG. 6.

An example of this is shown in FIG. 9. A clip 901, comprising frames 911, 912, 913, 914 and 915 amongst others, is written to framestore 106. Storage control process 802 allocates the frames to physical locations in such a way as to minimise fragmentation. In this example that means that frame 911 is written to RAID 601, as shown by arrow 921, frame 912 is written to RAID 602, as shown by arrow 922, frames 913 and 914 are written to adjacent locations on RAID 603, as shown by arrows 923 and 924, and frame 915 is written to RAID 604, as shown by arrow 925.

FIG. 10

A frame-based storage system is herein defined as a frame storage system and its controlling hardware or software. In this embodiment the system comprising storage control process 802 and framestore 106 is a frame-based storage system. This system stores images as contiguous clips of frames, which means that although consecutive frames in a clip may be stored in any part of the framestore, data known collectively as metadata ensures that when a clip is played each frame is displayed in display sequence order within the clip. Metadata exists for each of framestores 106 and 108 and is stored on each framestore's respective processing system. However, in other embodiments (not shown) it could be stored on the framestore itself or at another location accessible via a network. A single frame is not accessible individually unless it is the only frame in a clip, in much the same way as a single word in a document produced by a word processing program is only accessible if the entire document is opened. Storage of frames individually would mean that if a user wished to edit them he would have to open every file himself and put them into order, and hence storage of images as contiguous clips of frames is standard in image processing environments. However, as will be described further below, some basic but useful applications store frames as individual files and are unable to interface directly with applications that store frames as clips.

Figure 10:
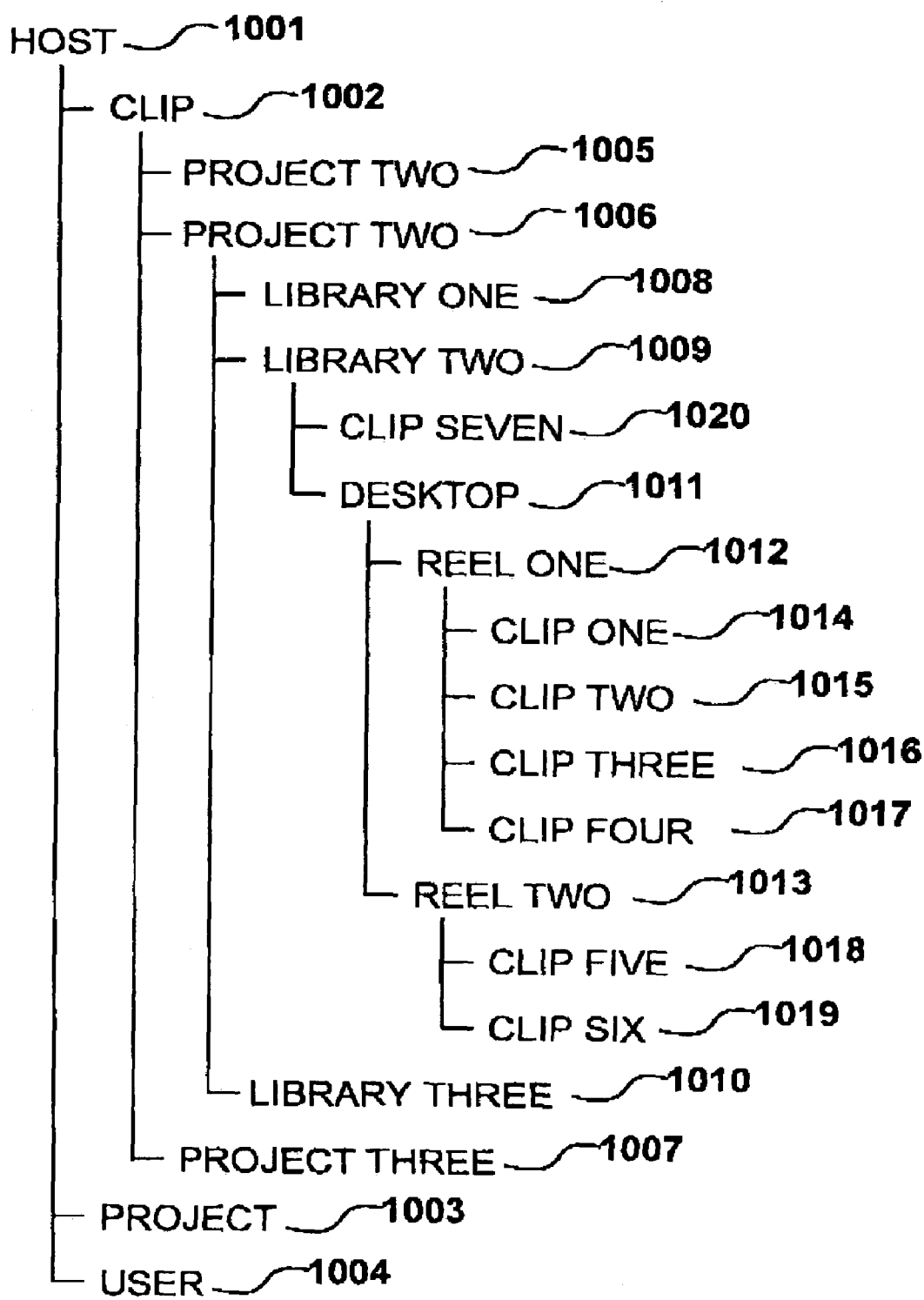
FIG. 10 details metadata which must be accessed in order to read clips of frames stored on the framestore shown in FIG. 6.

FIG. 10 illustrates the basic structure of the metadata for framestore 106. It is stored within HOST directory 1001, which is within the hard drive 327 of processing system 103. Directory 1001 contains three subdirectories, CLIP directory 1002, PROJECT directory 1003 and USER directory 1004. The contents of directories 1003 and 1004 are used by applications executed by processing system 103 to initialise project and user settings. Directory 1002 contains the information necessary to display the images stored on framestore 106 to the user.

As can be seen in FIG. 10, directory 1002 contains three subdirectories, PROJECT ONE directory 1005, PROJECT TWO directory 1006 and PROJECT THREE directory 1007. Each of these directories relates to a different job being done by the user of processing system 106. For example, Project One may be scenes from a film requiring complex special effects, Project Two may be a music video that needs to have the singer composited with an exotic background, and Project Three may be an advertisement that needs some animation. Here directory 1006 only is shown expanded but the directories relating to Projects One and Three contain similar directory structures.

Each project contains clip libraries. In this case Project Two has three clip libraries associated with it, shown by LIBRARY ONE directory 1008, LIBRARY TWO directory 1009 and LIBRARY THREE directory 1010. A clip library is a grouping of clips by the user, utilised to manage the image data. For example, since Project Two is a music video, Library One may contain clips relating to the compositing of a singer against a first background, Library Two may contain clips relating to the compositing of the singer against a second background, and Library Three may contain clips of other footage which is to be interspersed with footage of the singer. Here directory 1009 only is shown expanded but the directories relating to Libraries One and Three contain similar directory structures.

In conventional video editing source material is received on reels. Film is then spooled off the reels and cut into individual clips. Individual clips are then edited together to produce an output reel. Thus in order to provide a logical representation of original source material frames are still considered to be grouped in clips and clips are grouped in reels. This facilitates maintaining a relationship between the way in which the image data is represented within the processing environment and its actual physical realisation. Also, desktops are used to group reels and clips together within a clip library. Thus within directory 1009 is DESKTOP directory 1011 which contains REEL ONE directory 1012 and REEL TWO directory 1013. CLIP ONE data file 1014, CLIP TWO data file 1015, CLIP THREE data file 1016 and CLIP FOUR data file 1017 are stored within directory 1012; CLIP FIVE data file 1018 and CLIP SIX data file 1019 are stored within directory 1013. Additionally CLIP SEVEN data file 1020 is stored directly within LIBRARY TWO directory 1009. (In this embodiment clips cannot be stored directly within a desktop.) This structure is used to form a user interface which will be described with reference to FIG. 16. The skilled reader will appreciate that the Project, Library, Desktop and Reel hierarchy described here is simply an example of using a directory structure to store metadata and that any other ordered classification could be substituted without departing from the scope of the present invention.

FIG. 11

Each of data files 1014 to 1020 contains information necessary to display a clip to the user of processing system 103. Data file 1014 is shown in FIG. 11 it is a lookup table containing three columns. Column 1101 gives the frame identification (ID) of each frame in the clip and column 1102 gives its position in the display sequence order. In the current example the frame IDs follow the same sequence as the display sequence but this is not always the case, particularly if two clips are cut together to form a new clip. Column 1103 contains code listing any effects that are to be applied to the frames, but is currently empty since the clip has not yet been edited.

FIG. 12

Each frame ID is unique. It is assigned when the frame is captured and is used to look up the physical location of the frame in table 1201 shown in FIG. 12. Table 1201 is stored in the first few blocks of the first disk of framestore 106, but in another embodiment (not shown) could be stored on processing system 103, possibly with the metadata. This table is referred to by any application wishing to access frames stored on the framestore, and is updated whenever image data is captured to or archived from framestore 106.

Column 1202 lists the frame IDs of the frames stored on framestore 106. Column 1203 gives a pointer to the first stripe of that frame and column 1204 indicates the size of the frame. Column 1204 is a creation timestamp showing when the frame was captured.

Thus if the user of processing system 103 requests an application to display a clip on monitor 203, the application accesses the metadata for framestore 106, and obtains the data contained in the clip file, for example clip file 1014. The ID of the frame that is first in display sequence order is obtained, the location of the first stripe of the frame is then obtained from table 1201. As described with reference to FIG. 8, the location of the remaining stripes is identified from an offset. The frame is then displayed on monitor 203 with any specified effects applied on the fly. Meanwhile, the application accesses the next frame, and so on. This results in real-time display of clips.

It will now be appreciated that the storage of a contiguous clip of frames is a fundamentally different procedure from the storage of an image file using a conventional operating system such as Windows™, and while applications executed by image processing systems 103 and 104 are able to interface directly with storage control process 802 and therefore access their respective (and, with permission, each others') framestores, many other image processing applications are available that, although providing useful functionality to an operator, are only capable of interfacing with general purpose operating systems using documented application program interfaces. Conventional applications are therefore not able to interface directly with a frame-based storage system such as that described herein. Applications such as these are executed by PCs 101 and 102, and may also be executed by image processing systems 103 and 104 when necessary, and such applications store frames as individual files.

FIG. 13

Figure 13:
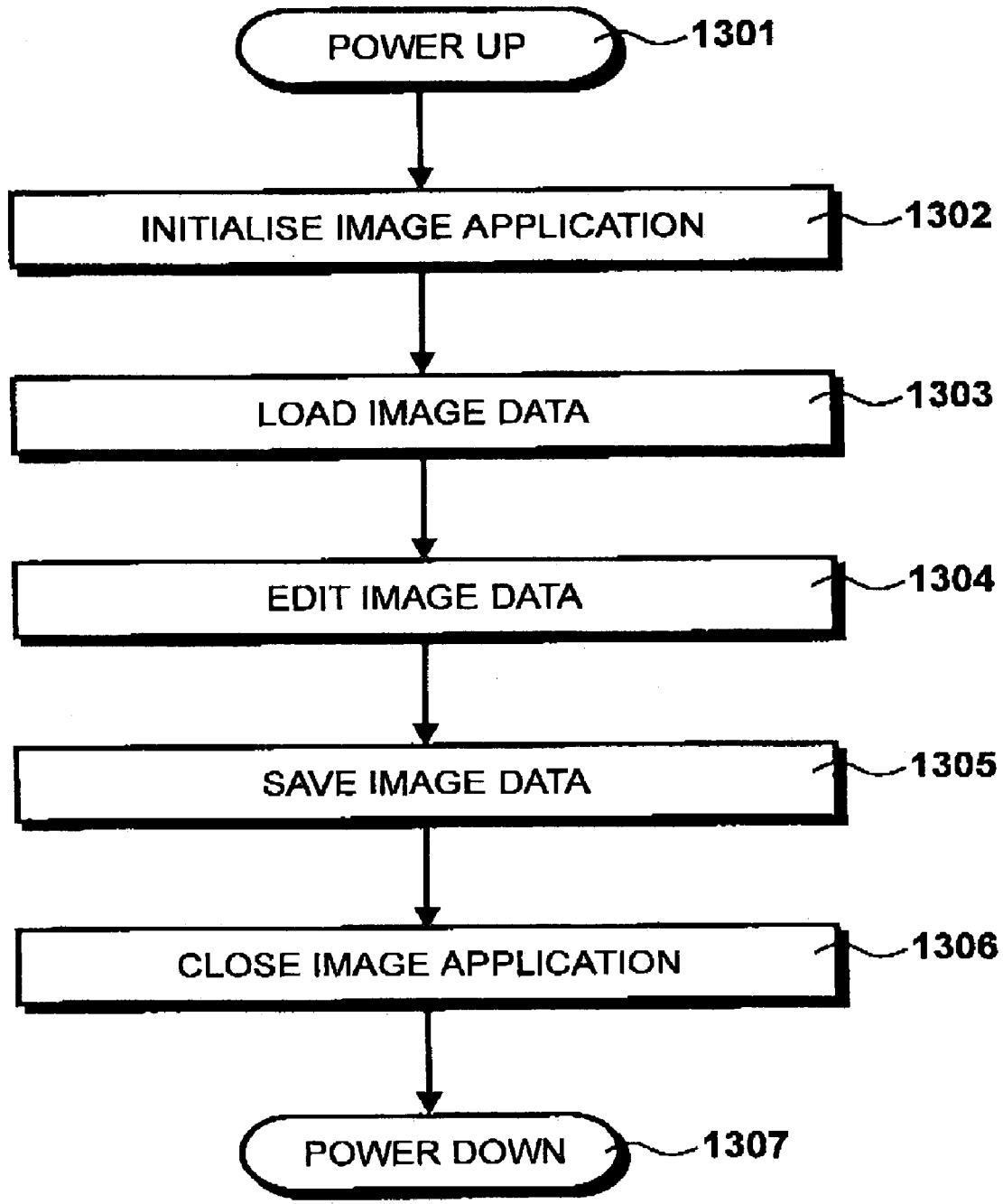
FIG. 13 details steps performed by the personal computer illustrated in FIG. 4.

Operations performed by PC 101 are detailed in FIG. 13. At step 1301 PC 101 is powered up and at step 1302 an imaging application is initialised. This imaging application may be one of many proprietary or open-source applications that run on a standard operating system and edit image data in formats such as JPEG, TARGA or TIFF. Many other imaging formats are available, but these three common ones will be used as examples herein.

At step 1303 the user loads the required image data into memory. He may load it from hard drive 303, via CD-ROM drive 306, or from storage operated by another machine on the network. Using the widely-available Server Message Block (SMB) protocol PC 101 and PC 102 can "see" each other's file systems that have been made available for sharing. Files can then be read and written over network 105. However, image processing systems 103 and 104 are not Windows-based and communicate using the Network Filesystem (NFS) protocol. In order for the PCs to communicate with the image processing systems, each of image processing systems 103 and 104 executes a Samba server. For example, the Samba server on processing system 103 emulates a Windows computer over Ethernet 105, converting SMB commands to NFS commands and vice versa. Thus, PCs 101 and 102 see imaging processing system 103 as another PC and communicate with it accordingly. In alternative embodiments where PCs 101 and 102 are not Windows-based either they may also be running Samba, or all four machines may be communicating using NFS.

While the Samba server allows PCs 101 and 102 to see image processing systems 103 and 104, they still cannot interface directly with a frame-based storage system. This is because a PC works on the assumption that a file is self-contained and is to be opened in isolation. A clip file telling an application to display one frame after another is a form of metadata which applications running on the PCs cannot understand. For this reason storage control process 802 on image processing system 103 executes threads which present the frames stored on framestore 106 to PCs 101 and 102 as individual files. A similar process is executed by image processing system 104. At step 1303, therefore, PC 101 can load image data from framestore 106 or framestore 108 if required, in addition to the aforementioned locations.

At step 1304 the user of PC 101 edits the image data loaded at step 1303 and at step 1305 he saves the changes he has made. At step 1306 he closes the image application and at step 1307 powers down PC 101.

In prior art systems the saving of the image data at step 1305 could only be to a PC's own hard drive, to a CD-ROM or to some other standard network-accessed storage. It is not possible in such systems for a PC to write to a framestore because applications executed by the PC cannot access a frame-based storage system directly, and can only access it indirectly to view the file structure or read frames. In order for frames edited by a PC to be stored on a framestore the user of the PC must save the frames in one of the locations mentioned above. The user of the system controlling the framestore must then import the frames and store them on the framestore.

The present invention, however, allows the user of PC 101 to save directly to framestore 106 or framestore 108. These files will then be instantly available to the users of any machine on Ethernet network 105.

FIG. 14

Figure 14:
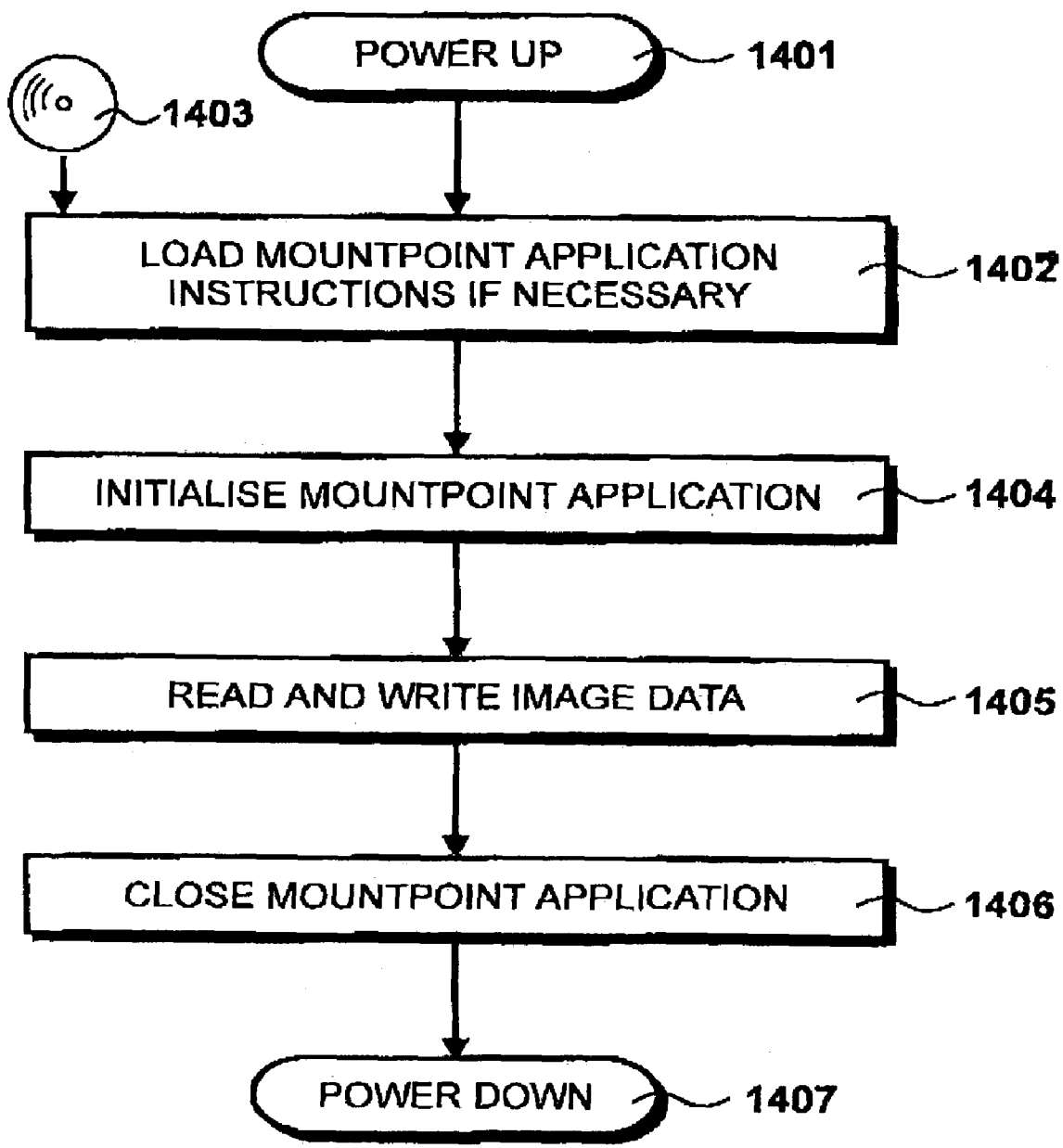
FIG. 14 details steps performed by the storage control process shown in FIG. 7.

FIG. 14 details steps performed by storage control process 802 executed by image processing system 103, which controls the storage on framestore 106 and forms part of the frame-based storage system. At step 1401 imaging processing system 103 is powered up and at step 1402 the instructions for storage control process 802 are installed if necessary from CD-ROM 1403 via CD-ROM drive 325.

At step 1404 storage control process 802 is initialised and at step 1405 the process performs its functions of reading and writing image data. This is a background process, transparent to the user of image processing system 103, that runs a number of threads when certain interrupts are received. Meanwhile, the user is editing image data using a specialised imaging application appropriate to the operating system executed by processing system 103.

At step 1406 storage control process 802 is terminated as part of the shutting down process and at step 1407 image processing system 103 is powered down

FIG. 15

Figure 15:
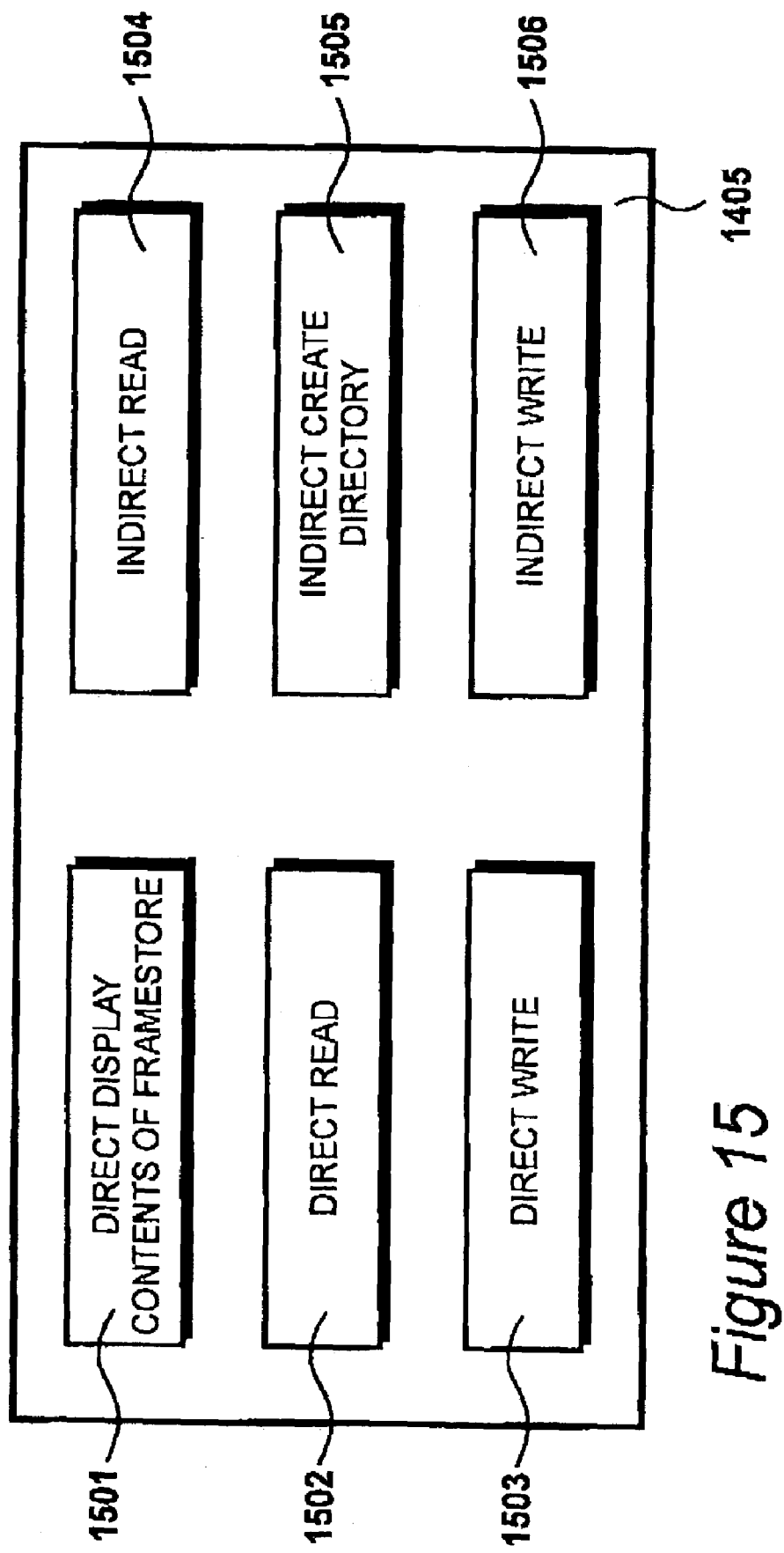
FIG. 15 shows functions performed during a step detailed in FIG. 14.

FIG. 15 shows the functions carried out by storage control process 802 at step 1405. At its core are the framestore display function 1501, the direct read function 1502 and the direct write function 1503. These functions are called by applications executed by image processing system 103, since they can interface directly with storage control process 802. They can also, if the network set-up allows it, be called by NFS commands issued by image processing system 104.

The other functions relate to indirect interfacing with the frame-based storage system by PCs 101 and 102. Thread 1504 creates a virtual file system, that PCs 101 and 102 can road, from the very different file system of framestore 106. Thread 1505 allows PCs 101 and 102 to create new directories within this virtual file system. Thread 1506 allows reading of frames on the framestore 106 by PCs 101 and 102, and thread 1507 allows writing of frames to framestore 106 by PCs 101 and 102. For example, PC 101 may issue an SMB command to view the filesystem of image processing system 103, which appears to PC 101 to be another PC. This command is converted to an NFS command by the Samba server and is processed by the indirect read thread 1506.

FIG. 16

Figure 16:
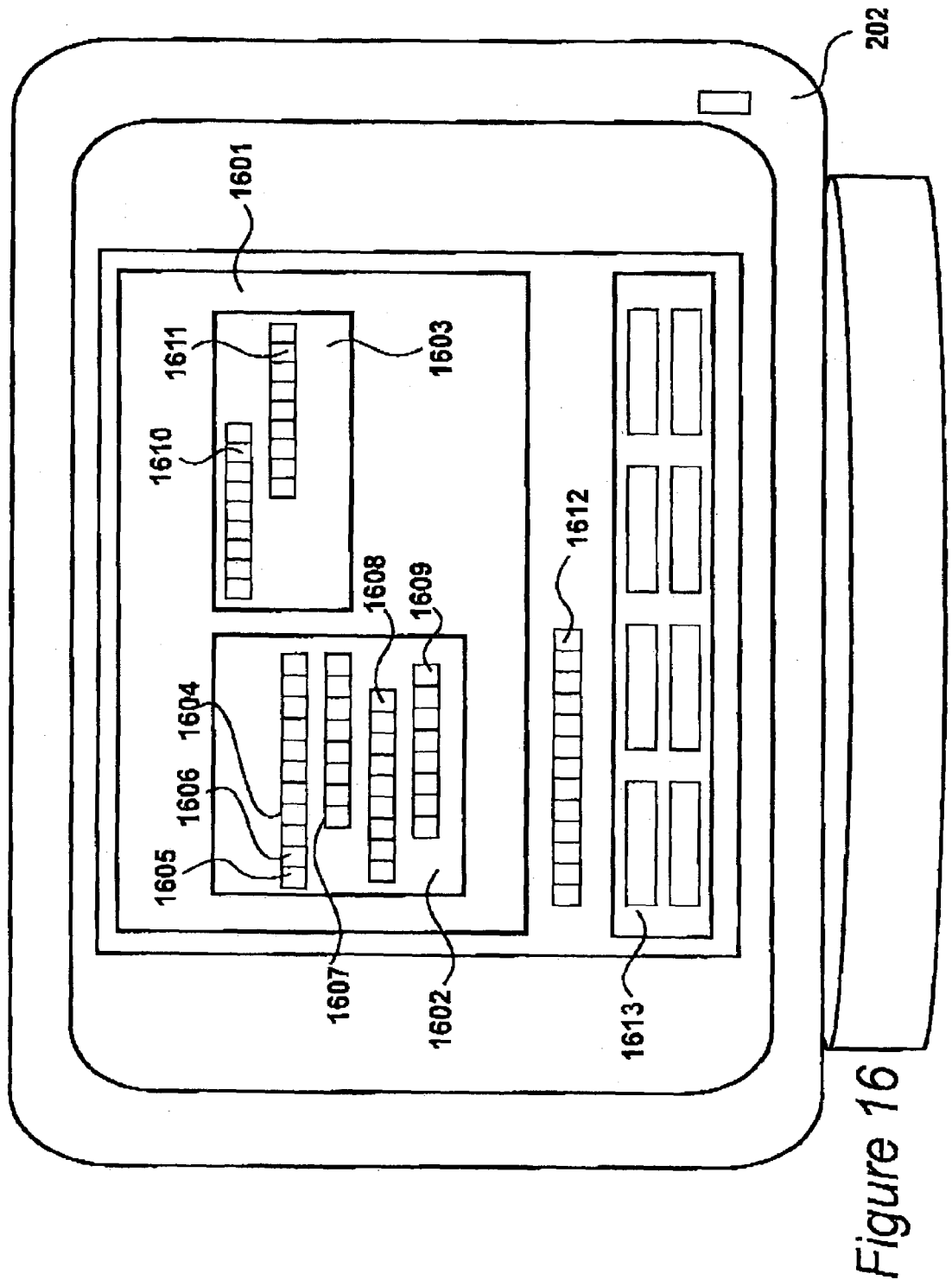
FIG. 16 illustrates a graphical user interface presented on the monitor shown in FIG. 2.

As described with reference to FIG. 10, the metadata contained in CLIP directory 1002, stored on image processing system 103, contains clip files defining how the actual image data on framestore 106 is presented to a user, in particular what clip each frame belongs to, in what order the frames should appear and what effects should be applied to them. This data is updated as operations and modifications are performed by a user. Function 1501 uses this data to present a graphical user interface to the user of image processing system 103, as illustrated in FIG. 16. In this example the user of system 103 has opened Library Two of Project Two, whose metadata is stored in LIBRARY TWO directory 1009.

A desktop 1601 is shown, which represents directory 1011. A first clip 1604 is held on reel 1602. This clip includes individual frames 1605 and 1606 etc. Reel 1602 also includes a second clip 1607, a third clip 1608 and a fourth clip 1609. Reel 1602 represents directory 1012, and thus clip 1604 represents the frames whose metadata is stored in clip file 1014, clip 1607 represents the frames whose metadata is stored in clip file 1015, clip 1608 represents the frames whose metadata is stored in clip file 1016 and clip 1609 represents the frames whose metadata is stored in clip file 1017. While individual frames are shown in this interface, they cannot be accessed singly unless a new clip is created containing only one frame.

A fifth clip 1610 is stored on real 1603, along with a sixth clip 1611. Here reel 1603 represents directory 1013, and clips 1610 and 1611 represent the frames whose metadata is stored in clip files 1018 and 1019 respectively. In addition, the clip library includes a seventh clip 1612 outside the desktop, which represents the clip whose metadata is stored in clip file 1020

The user interface as shown in FIG. 16 also includes function buttons 1613 allowing an operator to select particular operations to be performed on clips. Particular frames and clips are selected by an operator in response to manual operation of the stylus 204. Thus, within the user interface shown in FIG. 16, frames and clips may be selected and dragged within the display so as to effect operation by a particular process. Thus the hierarchical storage of metadata as shown in FIG. 10 is used to display the contents of framestore 106 to the user of image processing system 103 in an intuitive way. The clips can be moved into other reels or desktops, combined with other clips or split into more than one clip, each such operation creating a corresponding change in the metadata shown in FIG. 10.

Imaging applications executed by PCs 101 and 102 are not capable of creating such a user interface from the metadata shown in FIG. 10. If they were to access the metadata directly they would simply try to open each clip file, which of course is not the location of the actual images. A clip file is a tool allowing an application to access the frames stored on the framestore. Additionally, the frames are usually stored in an uncompressed format which is not suitable for PCs, and thus file translation is required in order for the PCs to operate upon the image data.

FIG. 17

PCs 101 and 102 cannot view the graphical user interface shown in FIG. 16 and so the contents of framestore 106 must be displayed in a different way. Since, by using the Samba protocol, image processing system 103 appears like a Windows-based PC on Ethernet network 105, PCs 101 and 102 can send SMB commands to it which are converted to NFS commands. These commands can be used to interrogate image processing system 103 about the contents of framestore 106 as if it were a PC being interrogated about the contents of its hard drive. No extra programs need be installed onto PCs 101 and 102 in order for this to be achieved.

Although the contents of framestore 106 do not conform to a conventional file structure—they are simply a jumble of images—the metadata is hierarchical. Hence the metadata can be displayed to the user of a PC as if it were an actual filesystem. However, as previously described, a PC cannot understand or use a clip file. Thus a virtual filesystem is created, in which each clip is represented to the user of a PC as a directory that contains a number of files, each file representing a frame. The user of the PC can then load a number of files, in effect loading a clip.

Figure 17:
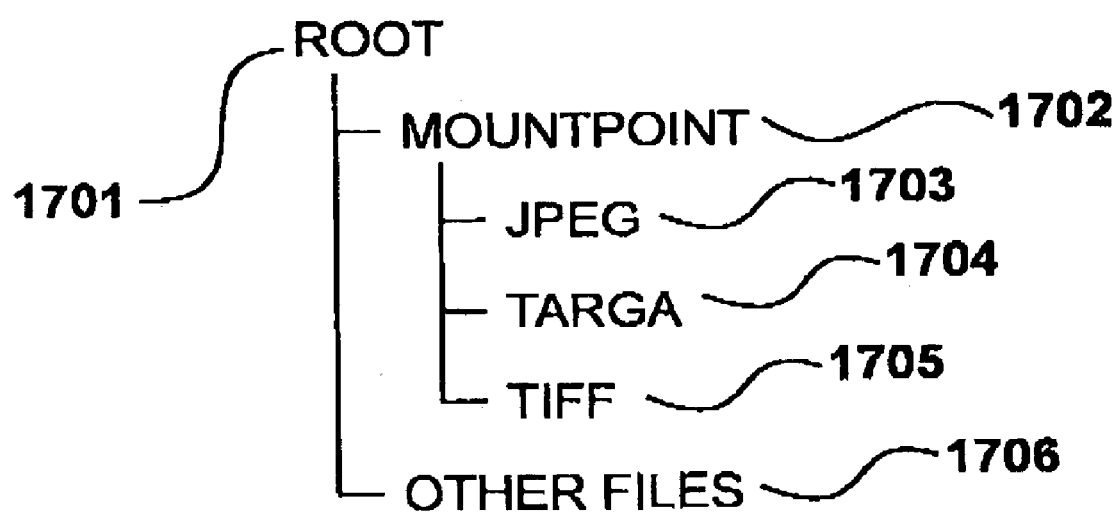
FIG. 17 shows part of a virtual filesystem created by a function shown in FIG. 15.

The basis of the virtual filesystem is shown in FIG. 17. Starting from a ROOT directory 1701, a directory 1702 called MOUNTPOINT resides. Directory 1702 contains three directories, JPEG directory 1703, TARGA directory 1704 and TIFF directory 1705. Any number of formats could be listed under directory 1702, as long as it is possible to covert an image from that format to the formats used by framestore 106 and back again. Also contained within directory 1701 is an OTHER FILES directory 1706, which contains such contents of hard drive 327 as the user of system 103 chooses to share over the network.

Figure 18:
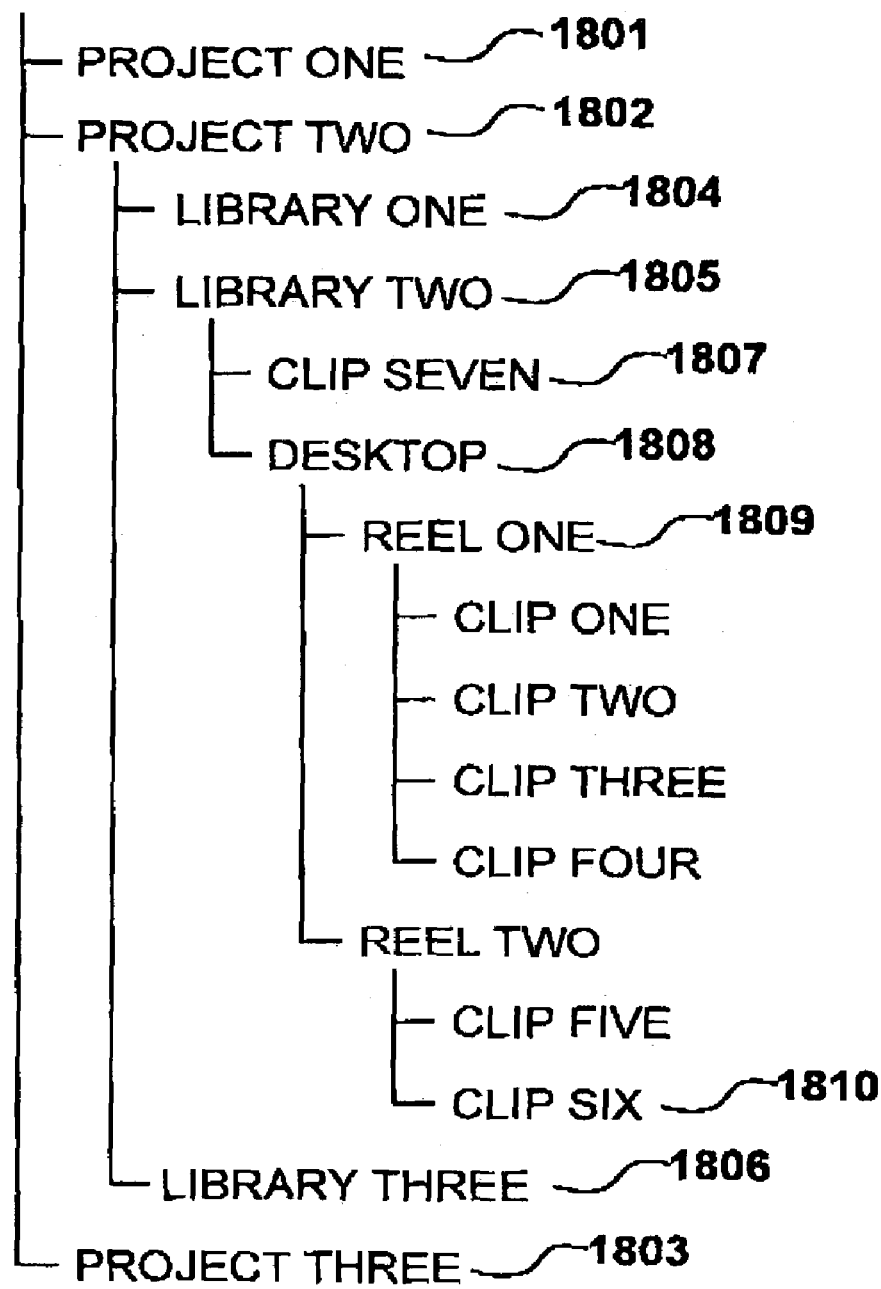
FIG. 18 shows part of a virtual filesystem based on the metadata shown in FIG. 10.

When requests to view the contents of framestore 106 (ie to open directory 1801) are received from PCs 101 or 102, the structure shown in FIG. 18 is displayed to the user. If the user opens any of JPEG directory 1703, TARGA directory 1704 or TIFF directory 1705 then the rest of the virtual filesystem, which is shown in FIG. 18, is shown dependent from that directory. Frames are then listed as individual files in the format specified by the opened directory. If the user requests to read the files the relevant frames are copied and converted to the correct format before being sent to the requesting PC. In order to view the same frames but in a different format the user simply selects a different format directory and sees the identical file structure appended thereto.

FIG. 18

FIG. 18 shows the second part of the virtual filesystem that is depended from each of directories 1703 to 1705 when opened. As can be seen, it is virtually identical to the hierarchical structure of the metadata shown in FIG. 10. However, the directories and clip files listed there are real, whereas the directories shown in FIG. 18 are virtual.

For example, when a user opens JPEG directory 1703, CLIP directory 1002 is interrogated and shown to contain directories 1005 to 1007. Therefore three virtual directories are displayed to the user, PROJECT ONE directory 1801. PROJECT TWO directory 1802 and PROJECT THREE directory 1803. These are not the same as directories 1005 to 1007, although they are given the same names. If the user then opens directory 18011 directory 1006 is interrogated and shown to contain directories 1008 to 1010. Therefore three virtual directories are displayed to the user, LIBRARY ONE directory 1804, LIBRARY TWO directory 1805 and LIBRARY THREE directory 1806. Again, these are virtual where directories 1008 to 1010 are real. If the user then opens directory 1805, directory 1009 is interrogated and shown to contain clip file 1020 and directory 1011. Therefore two virtual directories are displayed to the user, CLIP SEVEN directory 1807 and DESKTOP directory 1808. Directories corresponding to reels, for example directory 1013, are also represented in the virtual file system by directories, for example REEL ONE directory 1809.

Hence clip files are represented by directories in the virtual file system. For example, CLIP FIVE directory 1810, CLIP SEVEN directory 1807 and the other clip directories are virtual and contain virtual files corresponding to the frames belonging to their respective clips, whereas clip files 1014 to 1020 are real data files containing only pointers to frames. The creation of the virtual filesystem will be described further with reference to FIG. 21.

FIG. 19

Figure 19:
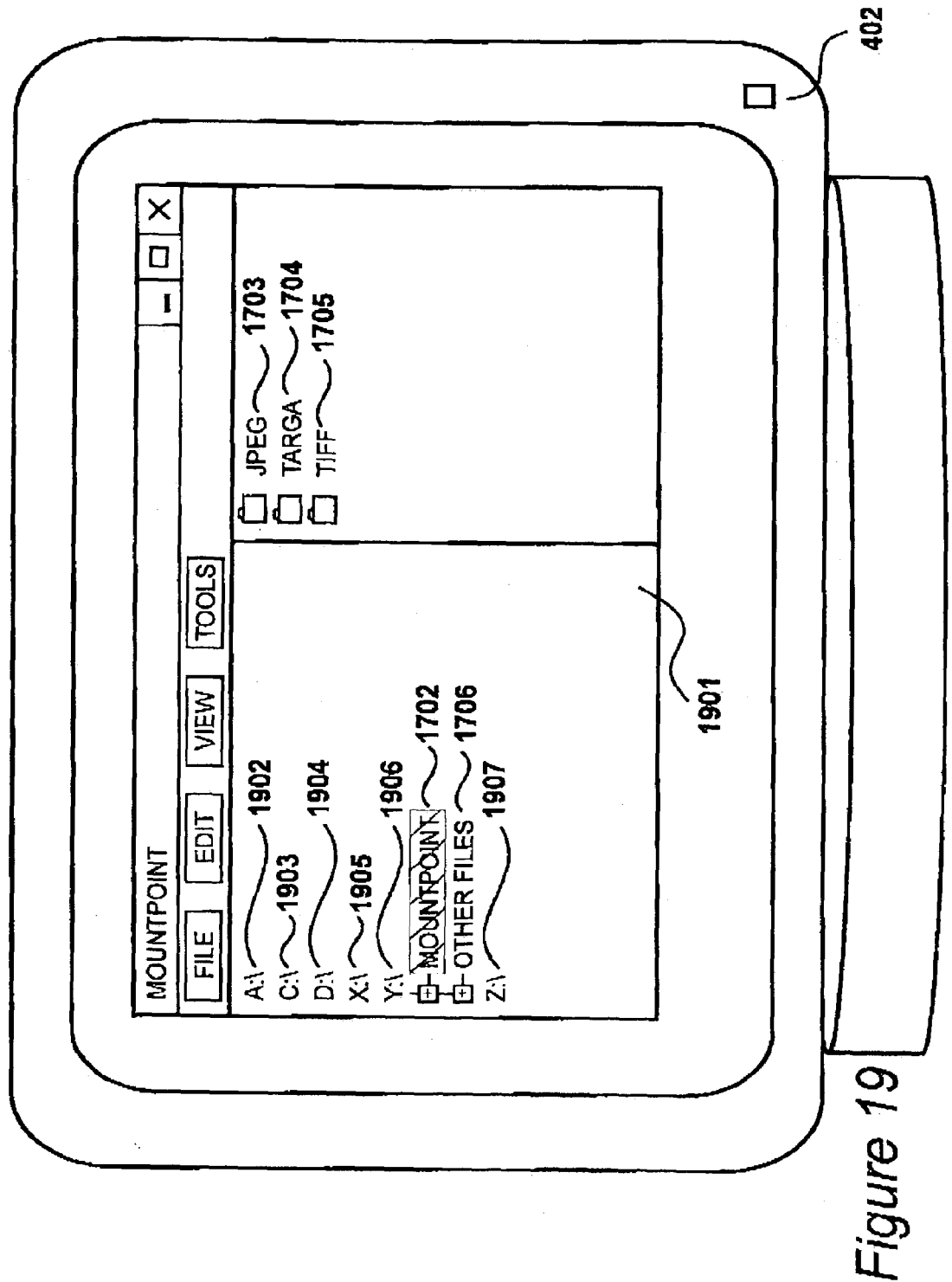
FIG. 19 illustrates a browser presented on a monitor shown in FIG. 4.

FIG. 19 illustrates a browser 1901 shown on monitor 402 of PC 101. At the highest level, the user can see a list of drives available to him. A:\ drive 1902, C:\ drive 1903 and D:\ drive 1904 represent respectively floppy disk drive 308, hard disk 303 and CD-ROM drive 306 on PC 101. X:\ drive 1905 is mapped to the hard disk of PC 102, which PC 101 can see over the Ethernet network using the SMB protocol. Y:\ drive 1906 is mapped to the virtual filesystem of image processing system 103 and Z:\ drive 1907 is mapped to the virtual filesystem of image processing system 104.

Within browser 1901 the user of PC 101 has selected the Y:\ drive and can therefore see the two directories MOUNTPOINT 1702 and OTHER FILES 1706. The user has selected directory 1702 and as can be seen in the other side of browser 1901 this appears to contain virtual JPEG directory 1703, TARGA directory 1704 and TIFF directory 1705.

FIG. 20

Figure 20:
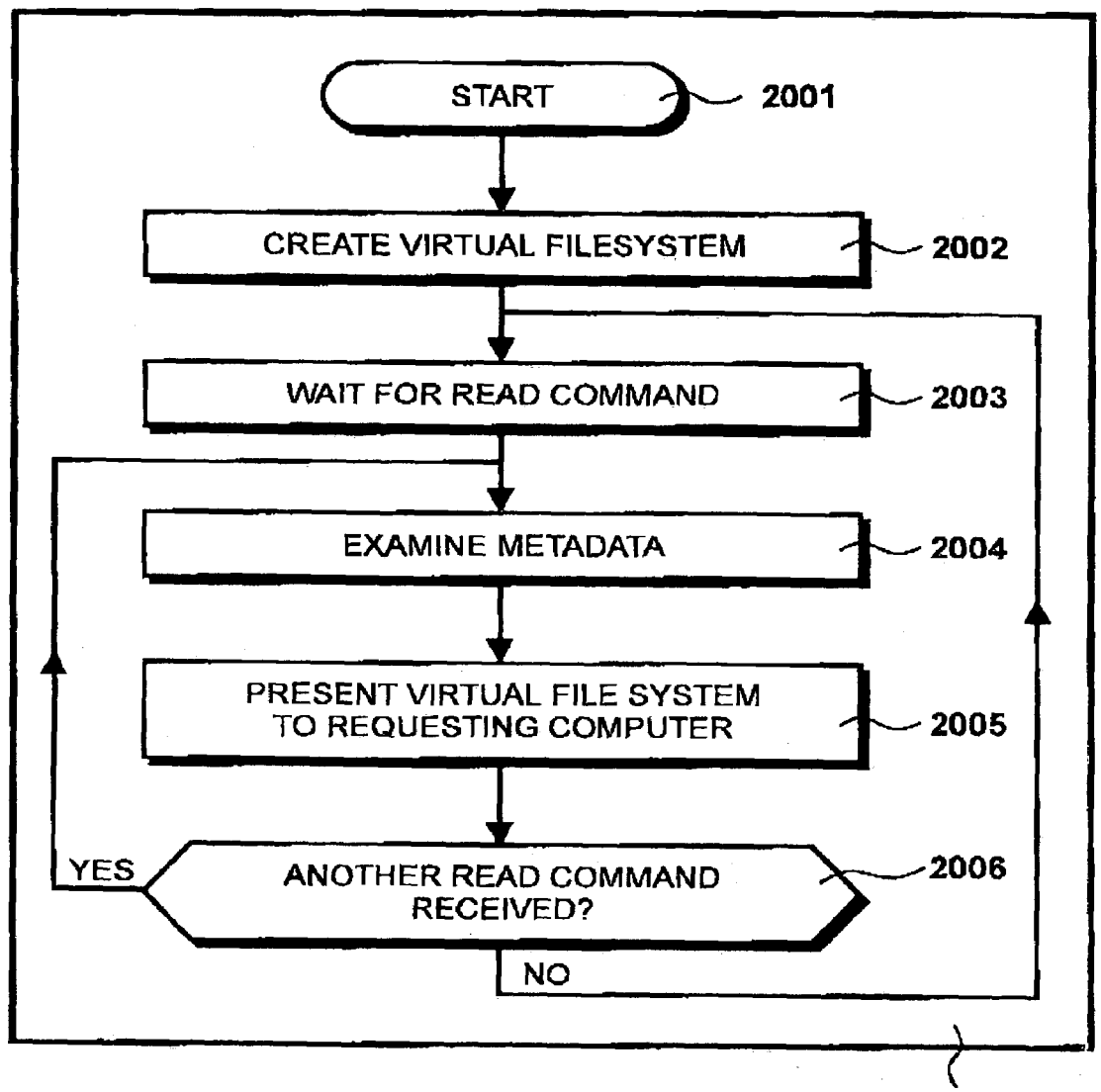
FIG. 20 details steps to create the virtual filesystem shown in FIGS. 17 and 18.

FIG. 20 details thread 1504 run by storage control process 802, which creates the virtual filesystem of framestore 106 and allows it to be viewed by PCs 101 and 102. This thread is started at the initialisation of process 802, as indicated by step 2001. The thread first creates directories corresponding to the basic virtual filesystem at step 2002, as shown in FIG. 17, comprising directories 1702 to 1706.

Referring to FIG. 19, when the user of PC 101 opens the Y:\ drive (for example by double-clicking on it, using a menu system or any other possible way of opening a directory) the PC sends an SMB command to image processing system 103, along with the path of the directory which it wishes to look up, ie Y:\. This is converted to an NFS READ command by the Samba server. Thread 1504 waits for such a command at step 2003.

When a READ command is received, then at step 2004 the thread examines the portion of the metadata shown in FIG. 10 that corresponds to the thread for the virtual filesystem that accompanies the command. At step 2005 the requested information is sent back to the PC.

At step 2006 a question is asked as to whether another READ command has been received. If this question is answered in the affirmative then control is returned to step 2004, whereas if it is answered in the negative control is returned to step 2003 and the thread waits for another READ command. The thread is terminated when storage control process 802 is terminated.

FIG. 21

Figure 21:
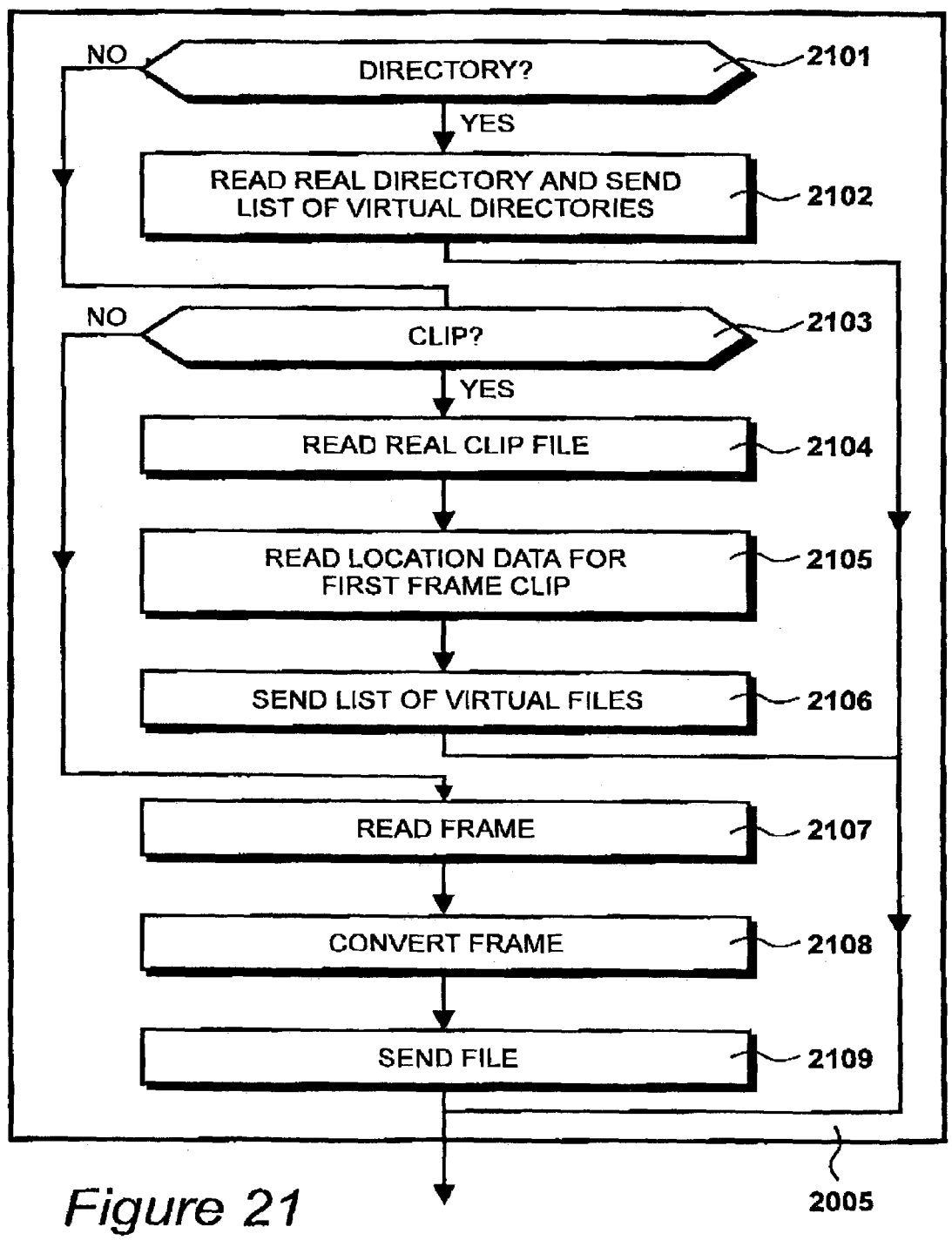
FIG. 21 details steps carried out in FIG. 20 to present the virtual filesystem to a remote processing system.

FIG. 21 details step 2005 at which thread 1504 sends information relating to the virtual file system to the PC responsible for the READ command, in this example PC 101.

At step 2101 the process decides, as a result of the examination carried out at step 2004, whether the path accompanying the READ command indicates a directory in the metadata. A directory is defined as a directory which contains no frames, only further directories or clip files. A clip file contains the data necessary to read frames and is not a directory.

If the path accompanying the READ command refers to a directory then at step 2102 it is read. The names of the directories and clip files it contains are sent back to the requesting PC using NFS commands that are converted to SMB commands, but according to the attributes sent, all are directories, including the clip files.

Thus for example, as illustrated in FIG. 19, PC 101 is informed that the Y:\ drive contains directories MOUNTPOINT and OTHER FILES and displays this on the monitor. This concludes step 2005, for a directory, and control is directed to step 2006 at which the question is asked as to whether another READ command has been received.

For example, if the user of PC 101 then opens MOUNTPOINT directory 1702 another READ command is sent, accompanied by the path Y:\MOUNTPOINT. This time the information is returned to PC 101 that the JPEG, TARGA and TIFF directories 1703 to 1705 are the contents of directory 1702. Subsequent clicks on JPEG directory 1703, PROJECT TWO directory 1802 and LIBRARY TWO directory 1805. In the last case the displayed contents will be two directories, CLIP SEVEN directory 1807 and DESKTOP directory 1808. However if the user then selects directory 1807, the thread will identify it as representing clip file 1020 in the metadata and not a directory.

If the question asked at step 2101 is answered in the negative, to the effect that the path does not indicate a directory, then at step 2103 a question is asked as to whether it indicates a clip file. If this question is answered in the affirmative then at step 2104 the clip file is read to identify how many frames are present in the clip and the frame ID of the first frame in the clip. At step 2105 table 1201 is read to find the size of this first frame. Since all frames in a clip are of the same size no more need be considered.

At step 2106 details of a number of virtual files that are located within the selected virtual directory are sent to PC 101. Each file corresponds to a frame in the clip and is named and numbered according to the name of the clip and the frame's position in the display-sequence order, as will be shown in FIG. 22, with a suffix indicating the format according to which of directories 1702 to 1705 has been selected For example, the user selects CLIP SEVEN directory 1807, which represents CLIP SEVEN clip file 1020, which contains the metadata for clip 1612 If clip 1612 contains 100 frames then 100 filenames will be sent to the PC. Since, in this example, CLIP SEVEN directory 1807 is dependent from JPEG directory 1703, each of those 100 filenames will end ".JPG". If the user then selects one of these files then at step 2004 the thread will identify that the file does not exist within the metadata and thus is not a directory or a clip If the question asked at step 2103 is answered in the negative, to the effect that the path does not indicate a clip, then it must indicate a file. At step 2107 the frame indicated by the file is read, at step 2108 it is converted into the indicated format and at step 2109 it is sent to the requesting PC.

FIG. 22

Figure 22:
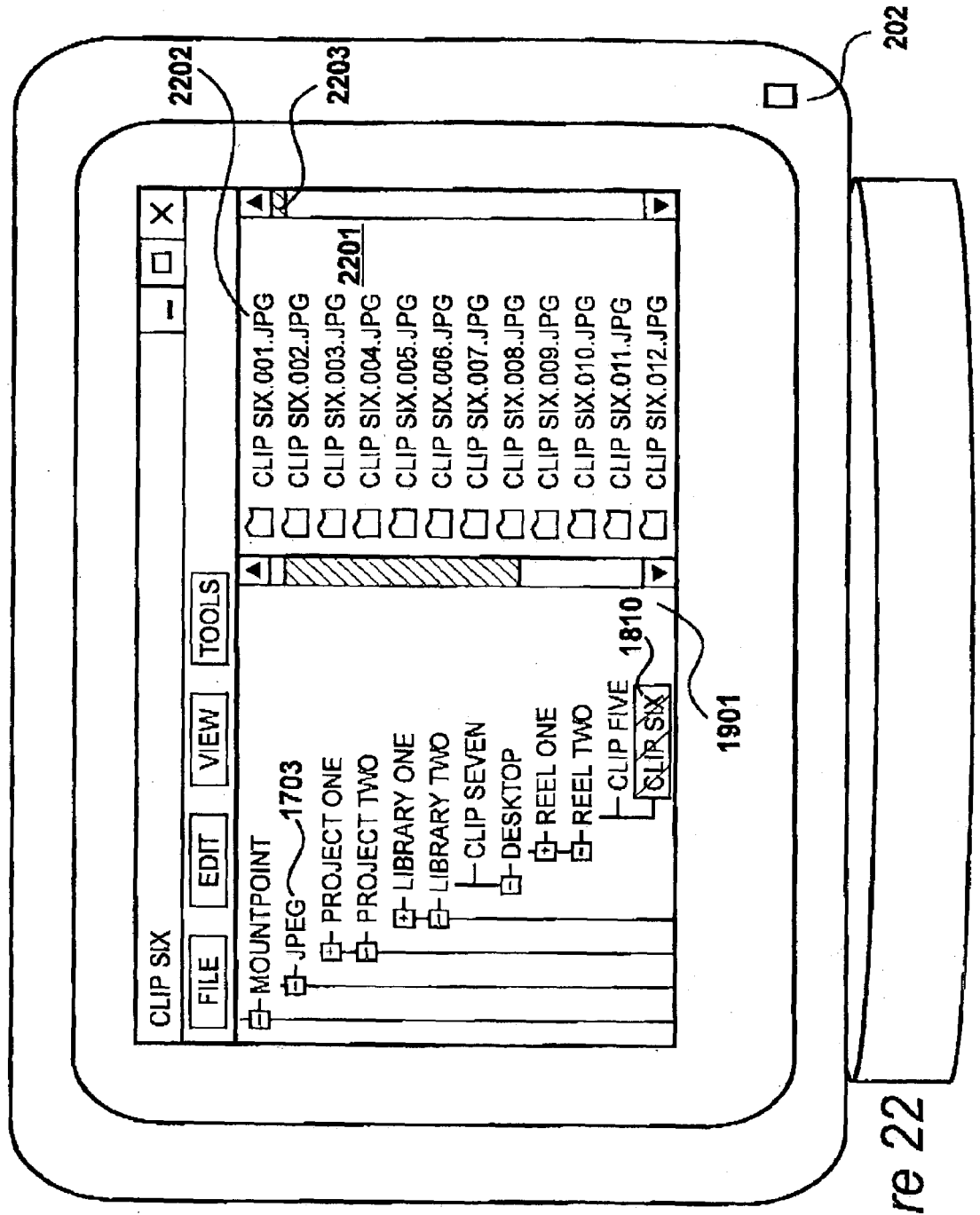
FIG. 22 illustrates the results of the function shown in FIG. 20 if a particular directory is selected.

FIG. 22 illustrates the virtual file system created by thread 1504 as displayed to the user of PC 101 via browser 1901 on monitor 402 By repeated opening of what the user considers to be directories, implemented by SMB commands converted into READ NFS commands over the Ethernet, the information provided by thread 1504 is displayed. The user has currently selected CLIP SIX directory 1809. This corresponds to clip file 1019 which contains the metadata for clip 1611. Thus the frames contained in clip 1611 are listed as if they were individual files 2201. For example, the first frame is indicated by file 2202 called CLIP SIX.001.JPG. These files are listed as JPEG files because the user has specified JPEG directory 1703. Scrollbar 2203 indicates that there are many more files in this directory. At this point none of files 2201 exists. They are simply a representation of the frames comprising clip 1611. Opening one of these files results in thread 1504 creating it and sending it to PC 101. For example, if the user opens file 2202 the first frame in clip 1611 is read from framestore 106, converted to the JPEG format and sent to PC 101.

FIG. 23

Figure 23:
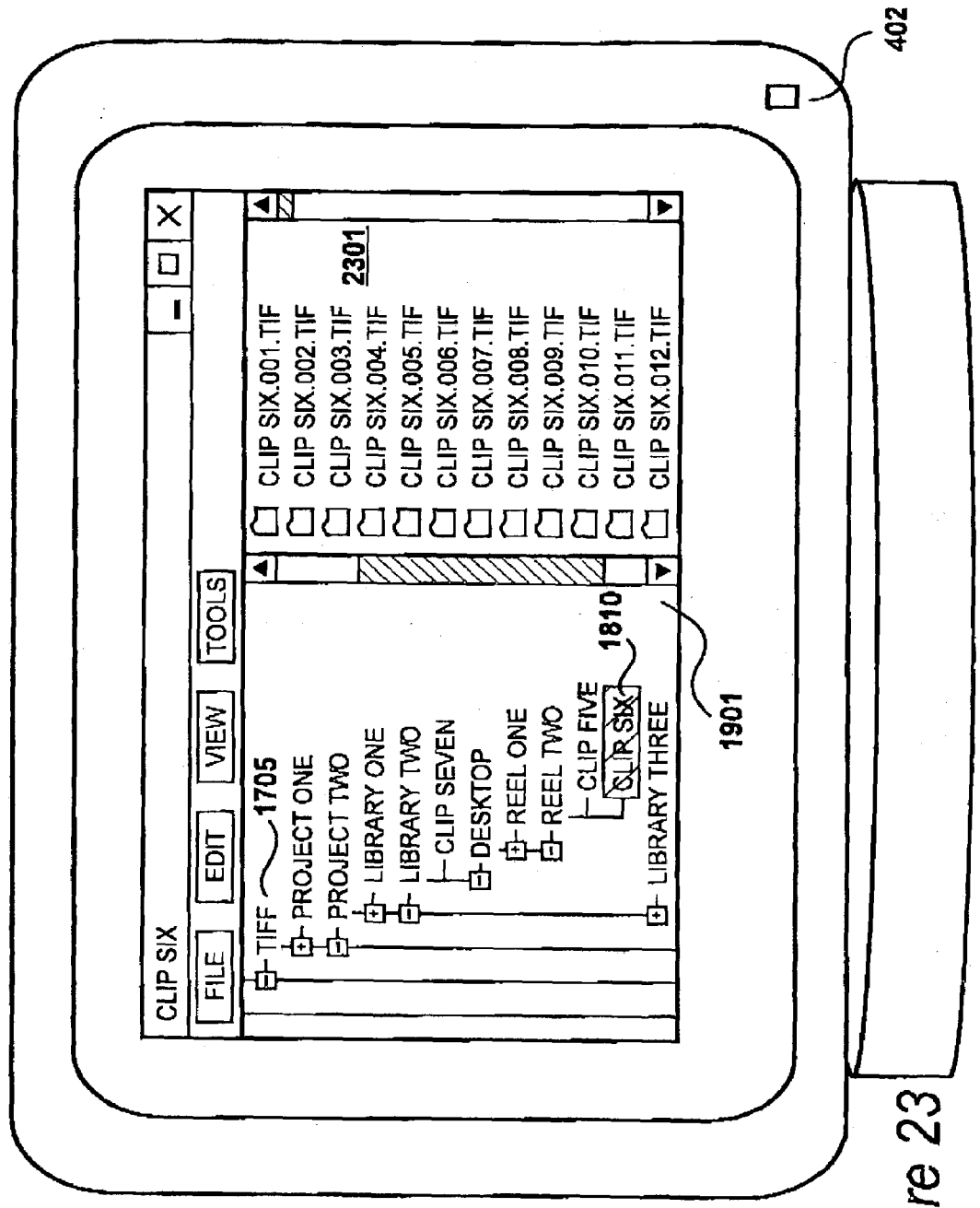
FIG. 23 illustrates the results of the function shown in FIG. 20 if a different directory is selected.

FIG. 23 again illustrates browser 1901 displayed on monitor 402 of PC 101, but in this case the user has selected TIFF directory 1705. As can be seen, the structure shown in FIG. 18 is appended to this directory exactly as it was appended to JPEG directory 1703 in FIG. 22. However, the frames comprising clip 1611 are listed as TIFF files 2301 instead of as JPEG files 2201.

FIG. 24

Figure 24:
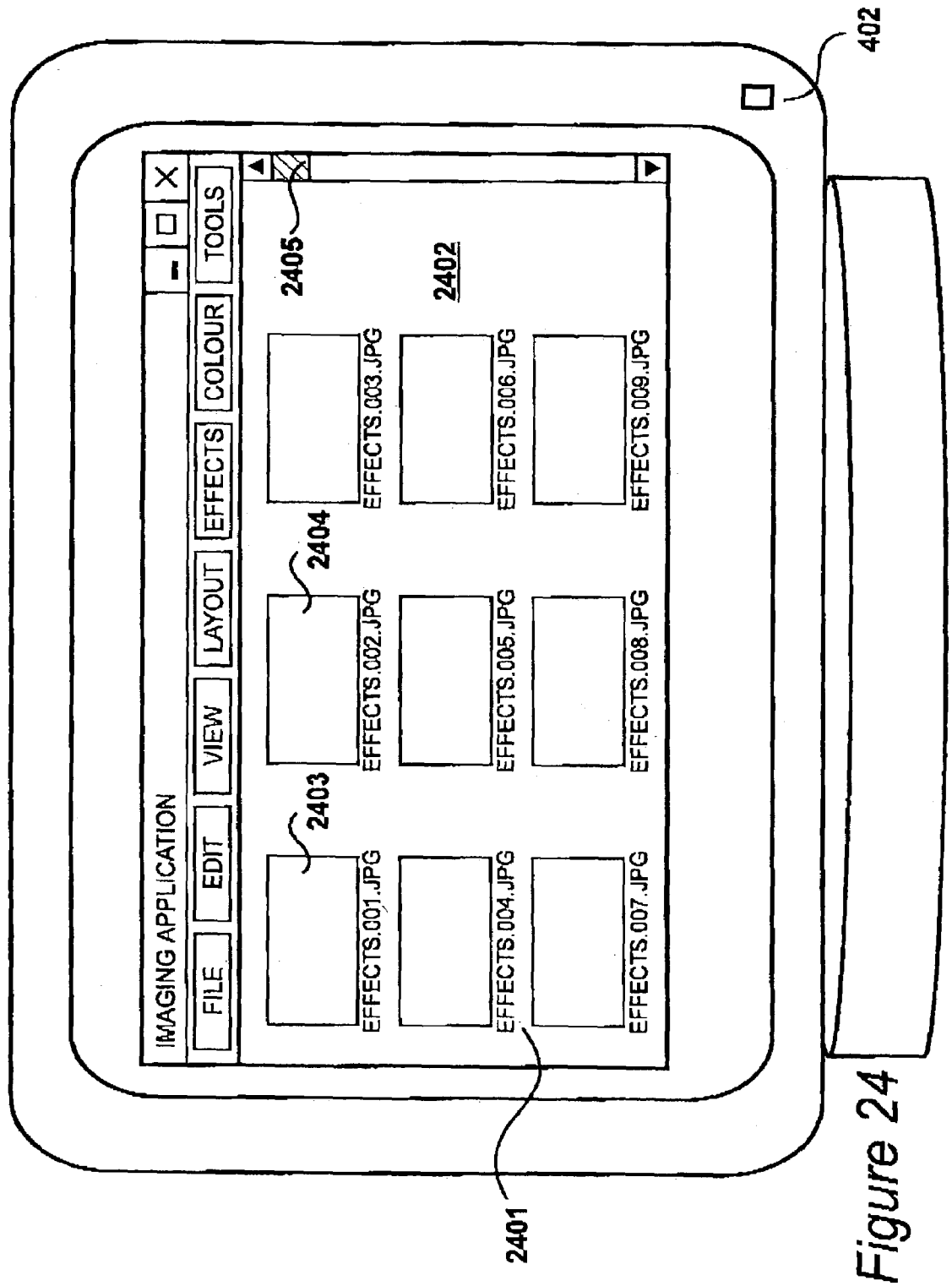
FIG. 24 illustrates an imaging application executed by the personal computer shown in FIG. 4.

FIG. 24 illustrates an imaging application 2401 executed by PC 101 that is displayed on monitor 402. Application 2401 could be one of many applications that can be executed by a PC and are capable of manipulating image data. In this example, imaging application 2401 is capable of saving many files at once, but this is not necessary.

As can be seen, the user of PC 101 has opened several JPEG files, indicated generally at 2402. These include file 2503, called EFFECTS.001.JPG, file 2504, called EFFECTS.002.JPG, and so on. Scroll bar 2405 indicates that there are many more files currently open. Each of these files has the same name format, that is EFFECTS followed by a number indicating the position of that file in the display-sequence order, followed by its format. These files may have been read from framestore 106 or may have come from another source, for example hard drive 503.

In previous systems the user of a PC could save these files either on the hard drive of the PC or in some other location accessible by his conventional operating system. However, in order for the files to be saved as a clip on a frame-based storage system it would be necessary for the user of the processing system controlling the framestore to import them from the chosen location. This is time-consuming, and particularly so when images are being rendered. Rendering can take many hours and is typically left overnight. In prior art systems, the files would then have to be imported onto the frame-based storage system in the morning, thus incurring even more time delays.

The present invention allows files 2402 to be saved directly to framestore 106, and if rendering is necessary files can be rendered directly to framestore 106 also.

FIG. 25

Figure 25:
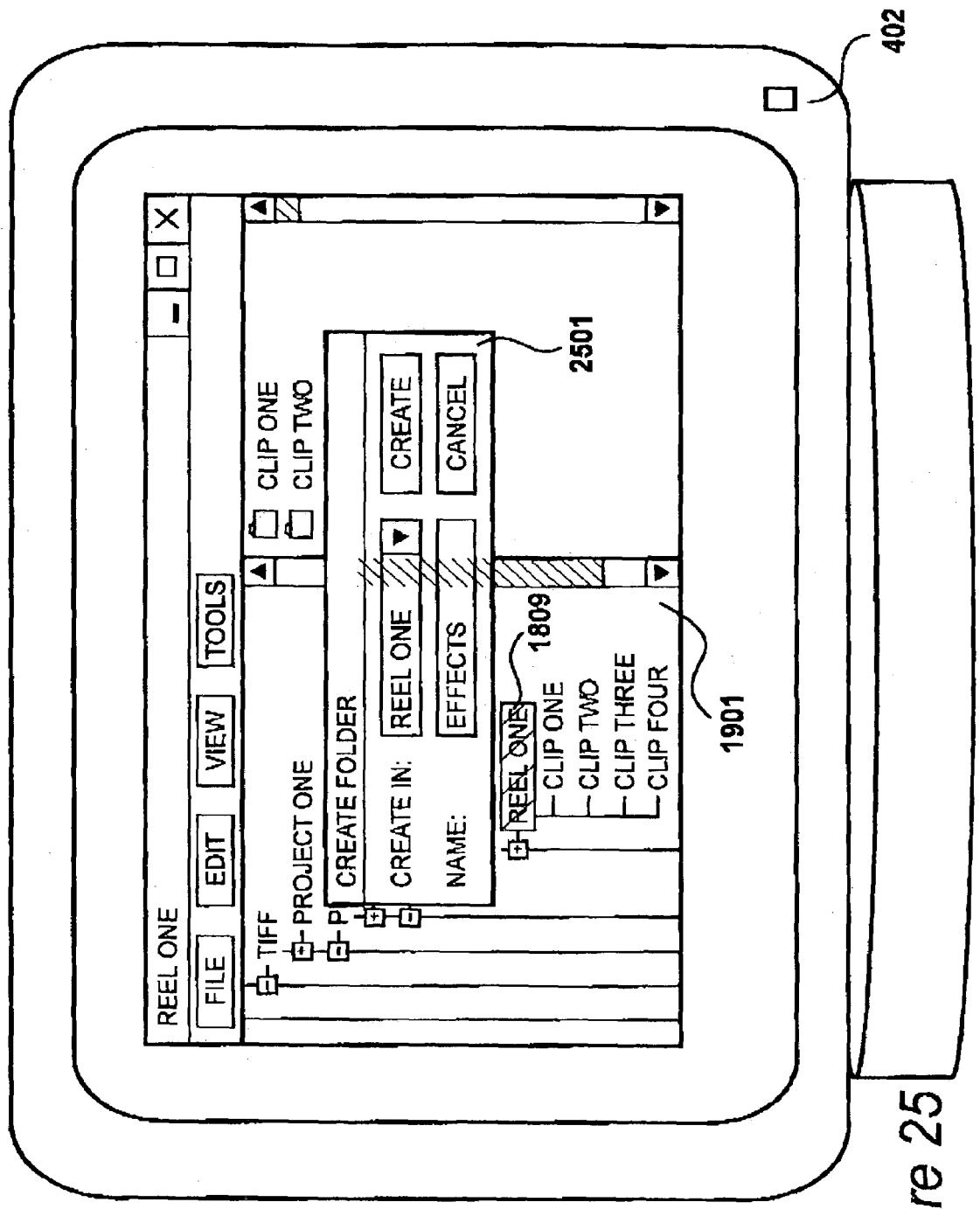
FIG. 25 illustrates a new directory being created on the personal computer shown in FIG. 4.
Figure 26:
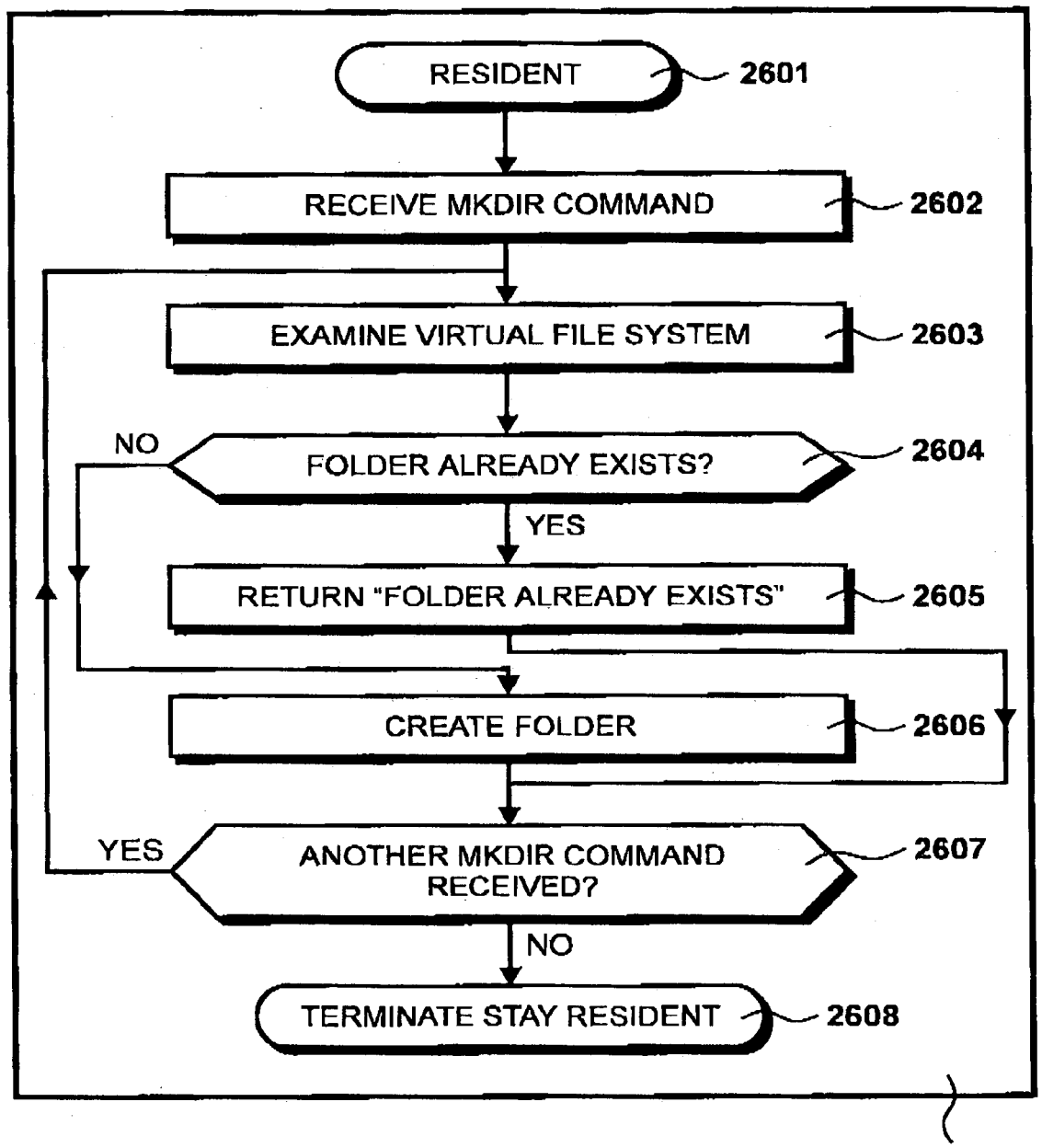
FIG. 26 details the indirect create directory function shown in FIG. 15.

In order for files 2402 to be saved on framestore 106, there must be a directory created for them within the virtual file system. FIG. 25 illustrates browser 1901 running on PC 101 displayed on monitor 402. The user is creating a directory called EFFECTS in REEL ONE directory 1809 on framestore 106. This is done by means of dialogue box 2501. However, as the skilled user will appreciate, there are many ways to create a new directory in applications that run on conventional operating systems and so this could also be done, for example, from a SAVE AS dialogue box within an application or in another way with which the user feels comfortable. Since PC 101 sees image processing system 103 as just another PC, the new EFFECTS directory can be created in any in which the user could create a new directory on PC 101 or PC 102.

The directory created by the user of PC 101 must have the same name as the first part of the names of files 2502, ie EFFECTS. This is in order to keep the virtual file system consistent.

FIG. 26

Figure 27:
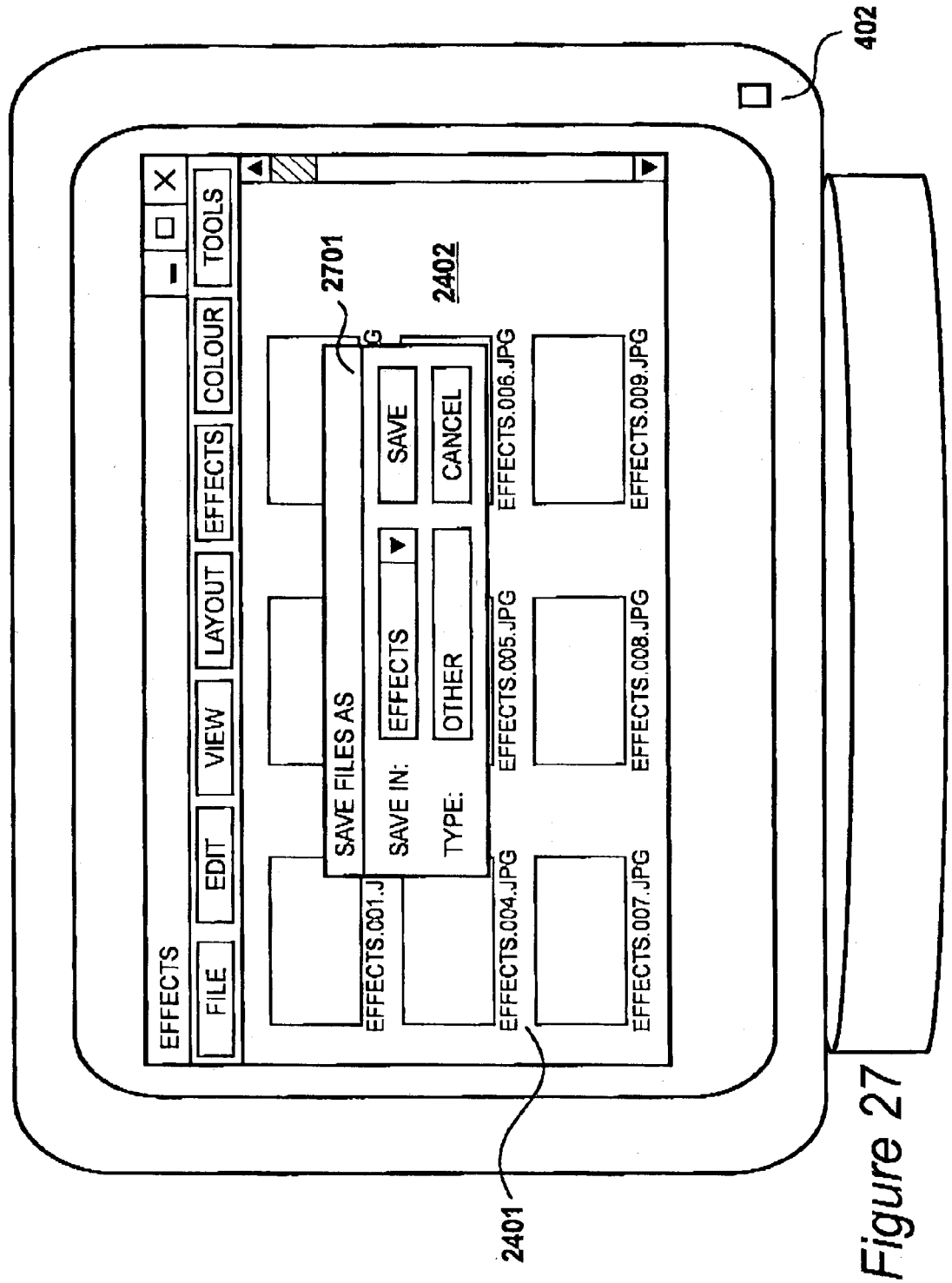
FIG. 27 shows files being saved on the personal computer shown in FIG. 4.

FIG. 27 details indirect create directory thread 1505, part of storage control process 802. Residency is shown at step 2601.

When the user of PC 101 creates a now directory in the virtual filesystem PC 101 sends an SMB command to image processing system 103, which is converted to a MKDIR NFS command. This acts as an interrupt to thread 1505, as shown at step 2602. At step 2603 the metadata shown in FIG. 10 that corresponds to the path received with the MKDIR command is examined, and at step 2604 a question is asked as to whether a directory or clip file with this name already exists in the specified location. If this question is answered in the affirmative then at step 2605 the error message "DIRECTORY ALREADY EXISTS" is returned to PC 101. For example, the user may be trying to create a directory called EFFECTS in the virtual path Y:\MOUNTPOINT\JPEG\PROJECT ONE\LIBRARY ONE\DESKTOP\REEL TWO. The real path C:\HOST\PROJECT ONE\LIBRARY ONE\DESKTOP REEL TWO is examined and found not to contain a directory or clip file called EFFECTS.

If the question asked at step 2604 is answered in the negative then at step 2606 a clip file is created within the metadata and a directory is created within the virtual filesystem. It can therefore be seen as an empty directory by users indirectly accessing the frame-based storage system and as an empty clip by users of image processing systems 103 and 104 as soon as each refreshes their respective interfaces. At step 2607 a question is asked as to whether another MKDIR command has been received. If this question is answered in the affirmative then control is returned to step 2503, and if it is answered in the negative then at step 2608 thread 1505 terminates and stays resident.

FIG. 27

FIG. 27 again shows imaging application 2401 running on PC 101 and displayed on monitor 402. The user of PC 101 is saving files 2402 as shown by dialogue box 2701. They are being saved within the EFFECTS directory as an unknown type of file.

FIG. 28

Figure 28:
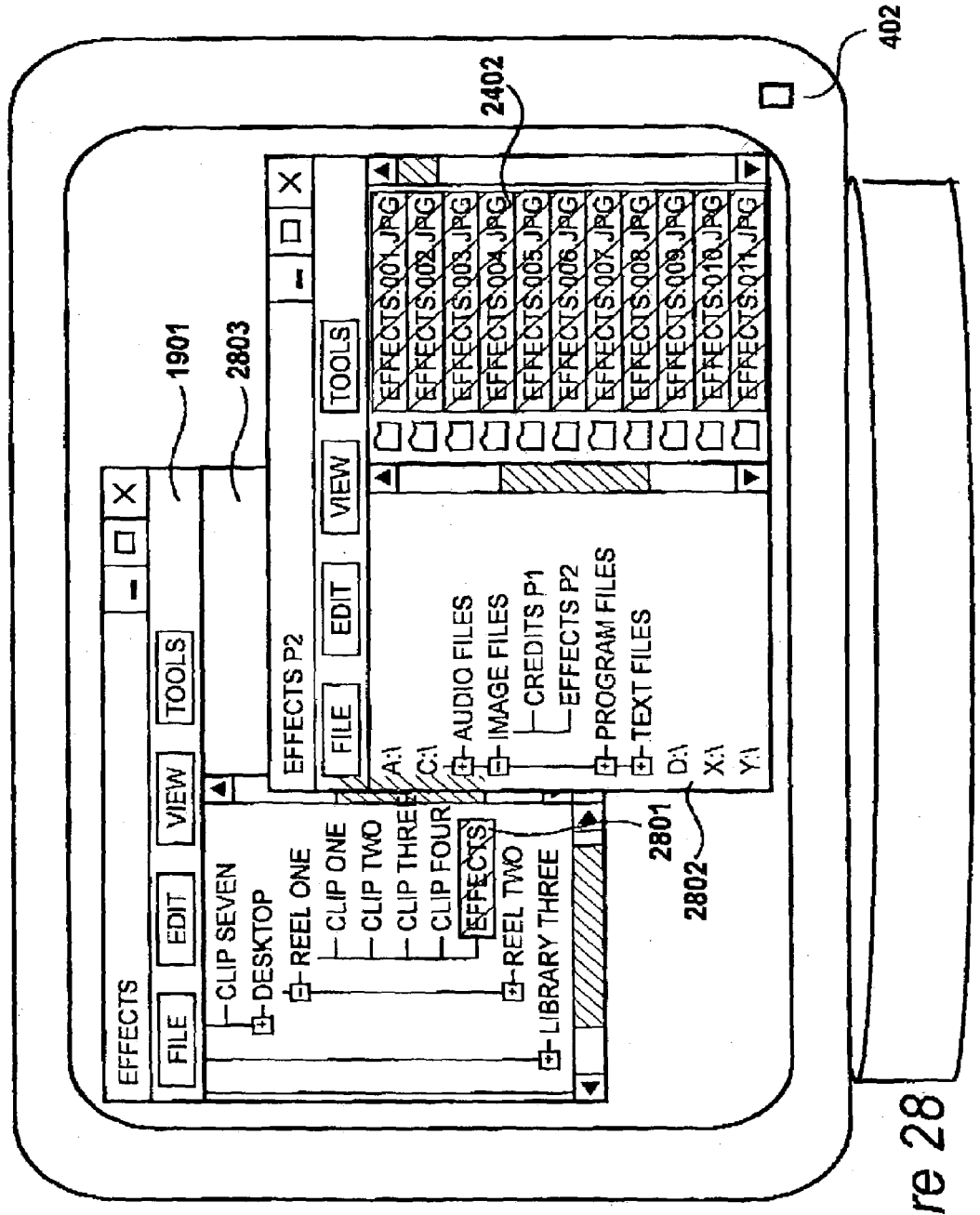
FIG. 28 shows files being moved on the personal computer shown in FIG. 4.

If PC 101 is not running an imaging application that can block save files, the user may move or copy files 2402 instead FIG. 28 shows browser 1901 which is currently displaying the contents of EFFECTS directory 2801. At this point, the directory is empty. A second browser 2802 has been opened which is currently displaying the contents of a directory called EFFECTS P2, which is stored on hard drive 503 of PC 101. As can be seen, files 2402 are located within this directory. The user can now drag and drop files 2402 into the right hand side 2803 of browser 1901, representing EFFECTS directory 2801, or copy or move them by any other method available to him.

Thus the user of PC 101 creates a directory and saves or moves files to it in the normal way. It will be understood that there are other methods of saving or moving files other than those described with reference to FIGS. 27 and 28. An object of this invention is to provide a method of writing a clip to framestore 106 which is compatible with image processing system 103 being seen as a system executing a conventional operating system by other machines on the network. Therefore, any method of saving files or moving files that would result in a command that is converted to a WRITE NFS command by the Samba server will be successful, including rendering.

FIG. 29

Figure 29:
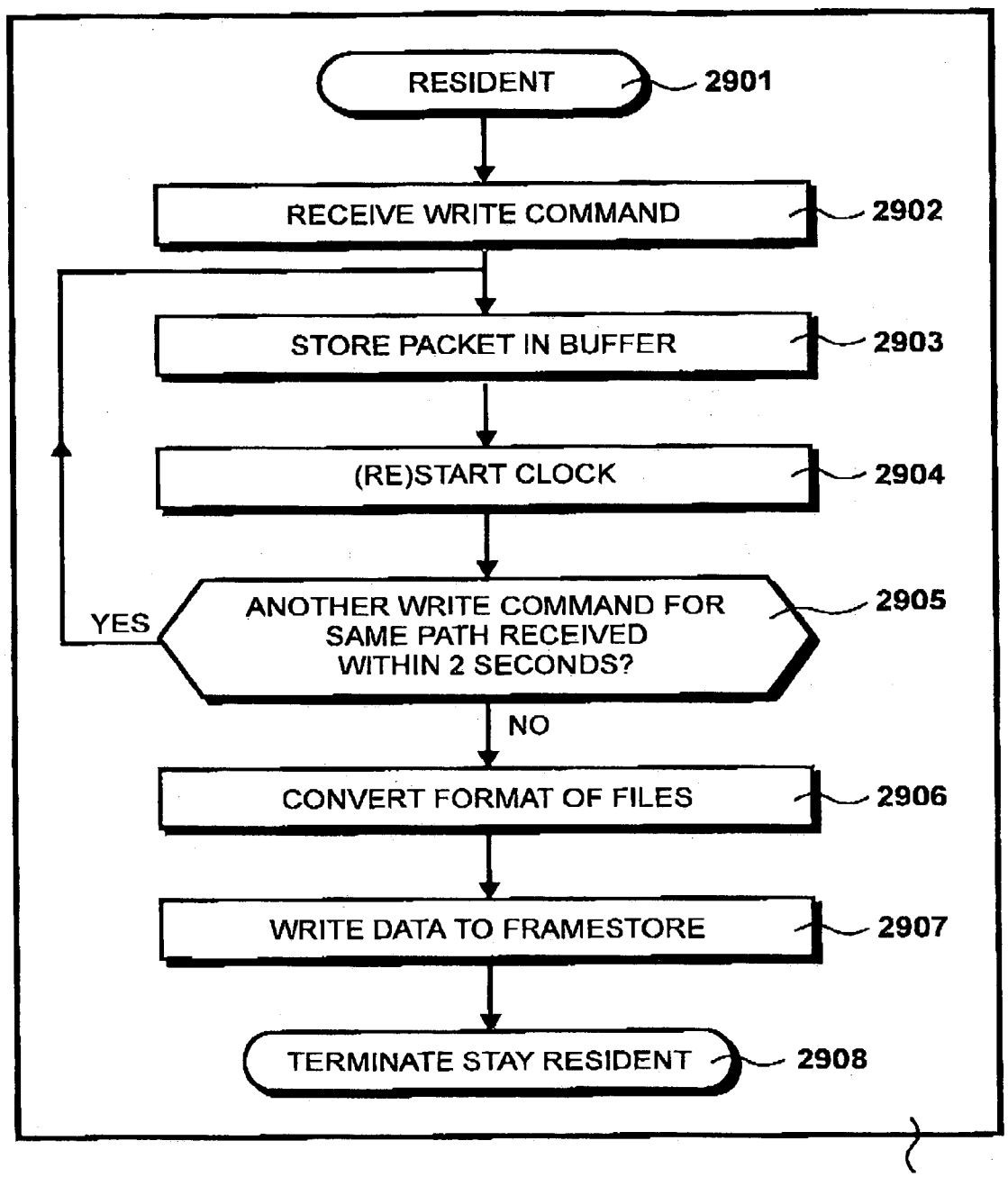
FIG. 29 details the indirect write function shown in FIG. 15.

FIG. 29 details indirect write thread 1506 executed by storage control process 802. Residency is illustrated by step 2901. When the user of PC 101 saves, moves or copies files 2402 to EFFECTS directory 2901, PC 101 sends commands to image processing system 103 that are converted to WRITE NFS commands by the Samba server. The first one of these to be received acts as an interrupt to thread 1507, as shown by step 2902. Each file is sent as a number of packets, each accompanied by a WRITE command and a path to which the packet is to be written. Thus a number of packets constitute one or more files, and each packet is considered as belonging to a specific file. Therefore, at step 2903 the packet received is stored in buffer 613, a hard partitioned portion of framestore 106. In an alternative embodiment (not shown) the buffer may instead be part of image processing system 103's hard drive 327.

NFS is a stateless protocol and therefore WRITE commands do not come with any indication of how many packets constitute a file, how many files are being sent altogether, the size of the total amount of data sent or when the last packet has been sent. All that is known, for each data packet, is what file that packet belongs to, how large the packet is and similar information regarding the specific packet. No information about the file itself is given. However, the frame-based storage system requires that storage control process 802 knows the size of the frames in a clip and how many frame there are before the clip can be written to framestore 106. This information can never be received when networks are sharing files using NFS or a similar stateless protocol. If the data packets, and therefore the files they constitute, were received in order it still might be possible to write them directly to a frame-based storage system, but many applications send files out of order and network management systems can also change the order of sent packets.

There are of course ways of programming computers and networks to solve this problem but an object of this invention is to allow conventional PCs or similar machines to write to frame-based storage systems over conventional networks using conventional protocols. The present invention therefore solves the problem by setting a timeout such that if no packets are received for a certain length of time it is assumed that all the data has been received and that the clip can be written to framestore 106. In this example the timeout is set to two seconds, which has been shown to be long enough in most cases. In the case of very large or rendered files each file may take much longer than two seconds to transfer, but every two seconds at least one data packet belonging to the file arrives. However, if the user of PC 101 is saving files to framestore 106 one at a time, instead of in a block, it may be necessary to increase the timeout to, for example, thirty seconds.

Therefore, to implement the timeout, at step 2904 a stopclock is started and associated with the directory that the file that the packet belongs to is to be written to, known as the specified directory, which is obtained from the path accompanying the WRITE command. The specified directory is here defined as the intended location of the file, excluding the filename. For example, if the actual path that accompanies the WRITE command is Y:/MOUNTPOINT/JPEG/PROJECT TWO/LIBRARY TWO/DESKTOP/REEL ONE/EFFECTS/EFFECTS.001.JPG, the specified directory is the EFFECTS directory, ie the path excluding the filename EFFECTS.001.JPG. However, other embodiments may use different directory structures for the metadata and in those cases the directory associated with the stopclock may be a different part of the path. For example, the thread may simply examine the filename which in this embodiment is the same as the directory, or the specified directory may be further from the end of the path. Note that although the WRITE command is a command to write the file to a specified directory, that directory only exists in the virtual filesystem. It would not be possible to actually write to the location given and so the command is interpreted by the indirect write thread as given here.

At step 2905 a question is asked as to whether another WRITE command has been received within two seconds that is accompanied by a data packet that belongs to a file associated with the specified directory. Again, this decision is taken by examining the path received with the command. If the question is answered in the affirmative then control is returned to step 2903, the accompanying packet is stored in buffer 613 and the clock is restarted. If it is answered in the negative then at step 2906 the files received are converted to the format used by framestore 106. At step 2907 the files are written to the framestore as a contiguous clip of frames, and at step 2908 the thread terminates and stays resident.

Hence there is provided apparatus including a network interface, frame storage means, a buffer and processing means, wherein the network interface receives a plurality of data packets, wherein said data packets constitute a plurality of image data files to be stored in the frame storage means; and the processing means stores said data packets in the buffer so as to arrange said image data files in a display-sequence order and writes said ordered image data files to the frame storage means as a contiguous clip of image frames.

Multiple versions of thread 1507 may be running in parallel at once, since a separate timeout must be set for each group of files being written even though they are stored in the same buffer. For example, PC 101 and PC 102 may both be saving to framestore 106 at the same time. Thus, if thread 1507 is already running and a WRITE command is received with a different path, this will initiate a separate version of thread 1507.

It will now be appreciated that although the application executed by PC 101 considers that it has created a directory in a remote filesystem and saved files to that directory, in fact this has not happened. In reality a clip file is created in the metadata shown in FIG. 10, the files are all written to a buffer and then written to the framestore as a clip of frames, with the metadata for the clip stored in the clip file. Thus the files themselves are not written to the location that PC 101 considers them to have been written to. However, it can immediately view the files in that location via the indirect read thread. Hence there is herein described a method of writing files to a framestore from a conventional processing system that cannot interface directly with a frame-based storage system, the method not requiring the conventional processing system to be changed or reprogrammed in any way.

FIG. 30

Figure 30:
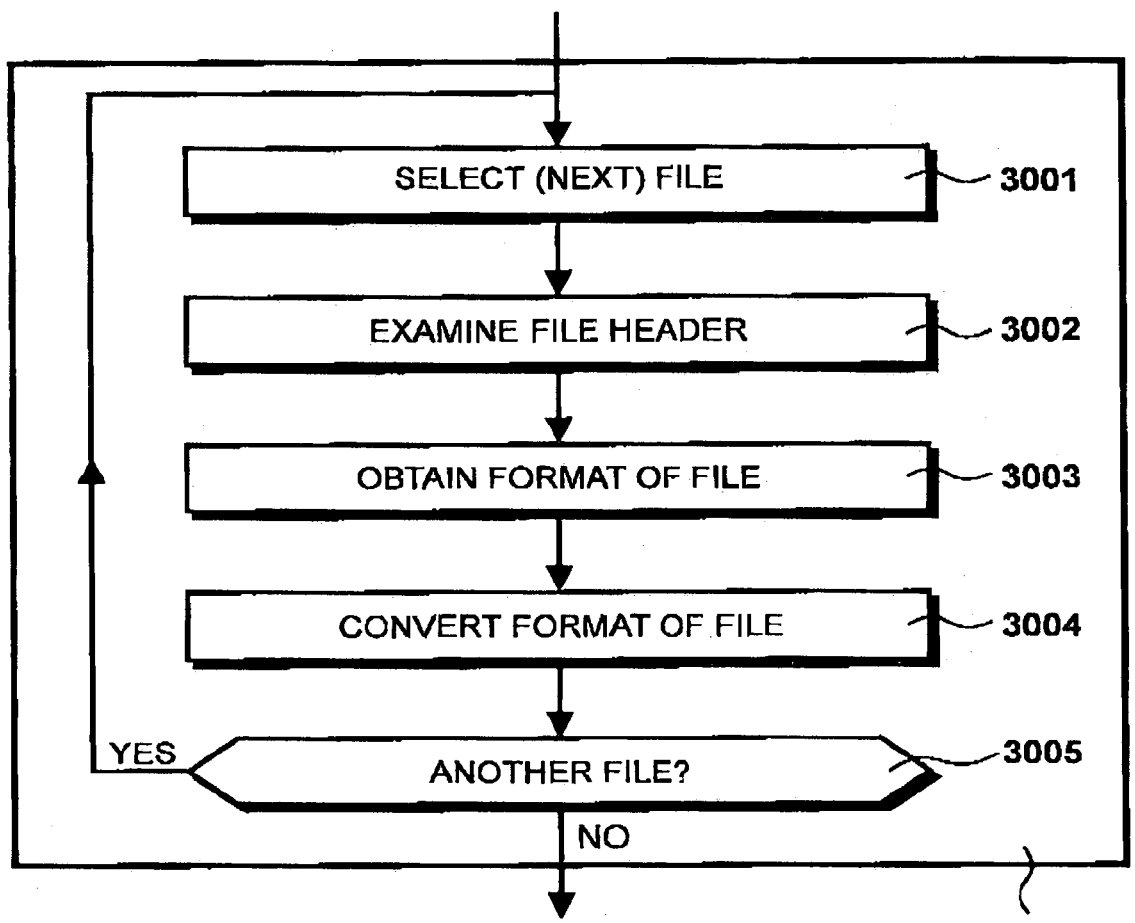
FIG. 30 details steps carried out in FIG. 29 to convert the format of saved files.

FIG. 30 details step 2906, at which the files received by image processing system 103 and stored in buffer 613 are converted into a format suitable for storage on framestore 106. At step 3001 the first file in the buffer, that is the first numbered file that is to be written to the specified path, is selected. In this example, the first would be EFFECTS.001.JPG, but the numbering need not be continuous or start from 001. At step 3002 the file header of this selected file is read. This is a small amount of data that is part of the first data packet for each file and contains certain basic information about the file, in particular its format, and so at step 3003 the format of the file is obtained. In this example, all the files are JPEG files. Thus at step 3004 the format of the selected file is converted to the format used by framestore 106.

At step 3005 a question is asked as to whether there is another file in the buffer, ie a file with a higher number than the last one selected. If this question is answered in the affirmative then control is returned to step 3001 and the next file is selected. Each file must be examined separately as there is no necessity for each file to be of the same format. For example, the sent files could be EFFECTS 001.JPG, EFFECTS.002.TRG and EFFECTS.003.TIF. Provided each file is named and numbered correctly the formats can be mixed.

If the question asked at step 3005 is answered in the negative then all the file formats have been converted and step 2906 is complete.

FIG. 31

Figure 31:
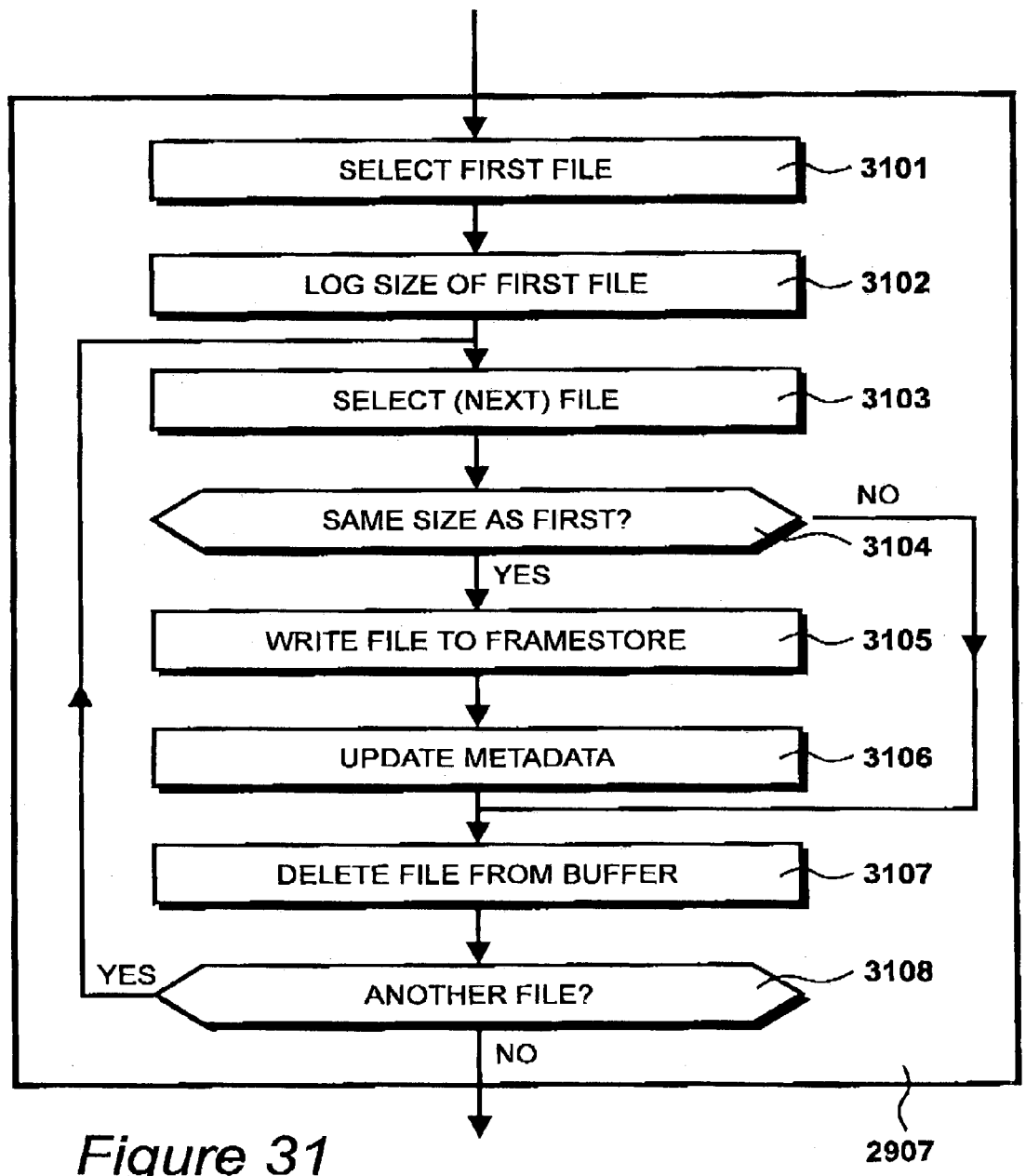
FIG. 31 details steps carried out in FIG. 29 to write files to the framestore shown in FIG. 6.

FIG. 31 details step 2907 at which the converted files are written to framestore 106. At step 3101 the first numbered file is selected and at step 3102 the size of this file is logged. All frames within a clip must be of the same resolution and so any files that are of a different size from the first will not be written to the framestore. Thus at step 3103 the next numbered file is selected and at step 3104 a question is asked as to whether it has the same size as the first file.

If this question is answered in the affirmative then at step 3105 the file is written to framestore 106. This is done in the standard way in which image data created by processing system 103 is written to the framestore and includes updating table 1201 which contains location information. At step 3106 the metadata given by the path of the specified directory is updated. Although that path is virtual, removing the basis of the virtual filesystem, which in this example is Y:/MOUNTPOINT/JPEG/, leaves the location of a real clip file, in this example EFFECTS file 2801. The exact method of discovering the real clip file from the virtual path will vary with the file structure used. Updating the clip file involves adding a line that contains the frame ID of the frame, allocated at step 3105 when the frame was written, and the display sequence position of the frame which is simply the next number in the clip file.

At this point, and if the question asked Vat step 3104 is answered in the negative, to the effect that the selected file is of a different size from the first, control is directed to step 3107 at which the file is deleted from buffer 613. Hence differently sized files are deleted without being written to framestore 106. However, other embodiments are envisaged in which files of different resolutions would be re-sized.

At step 3108 a question is asked as to whether there is another file in the buffer that is associated with the specified directory. If this question is answered in the affirmative then control is returned to step 3103 and the next numbered file is selected. If it answered in the negative then the clip has been written to framestore 106 and step 2907 is complete.

FIG. 32

Figure 32:
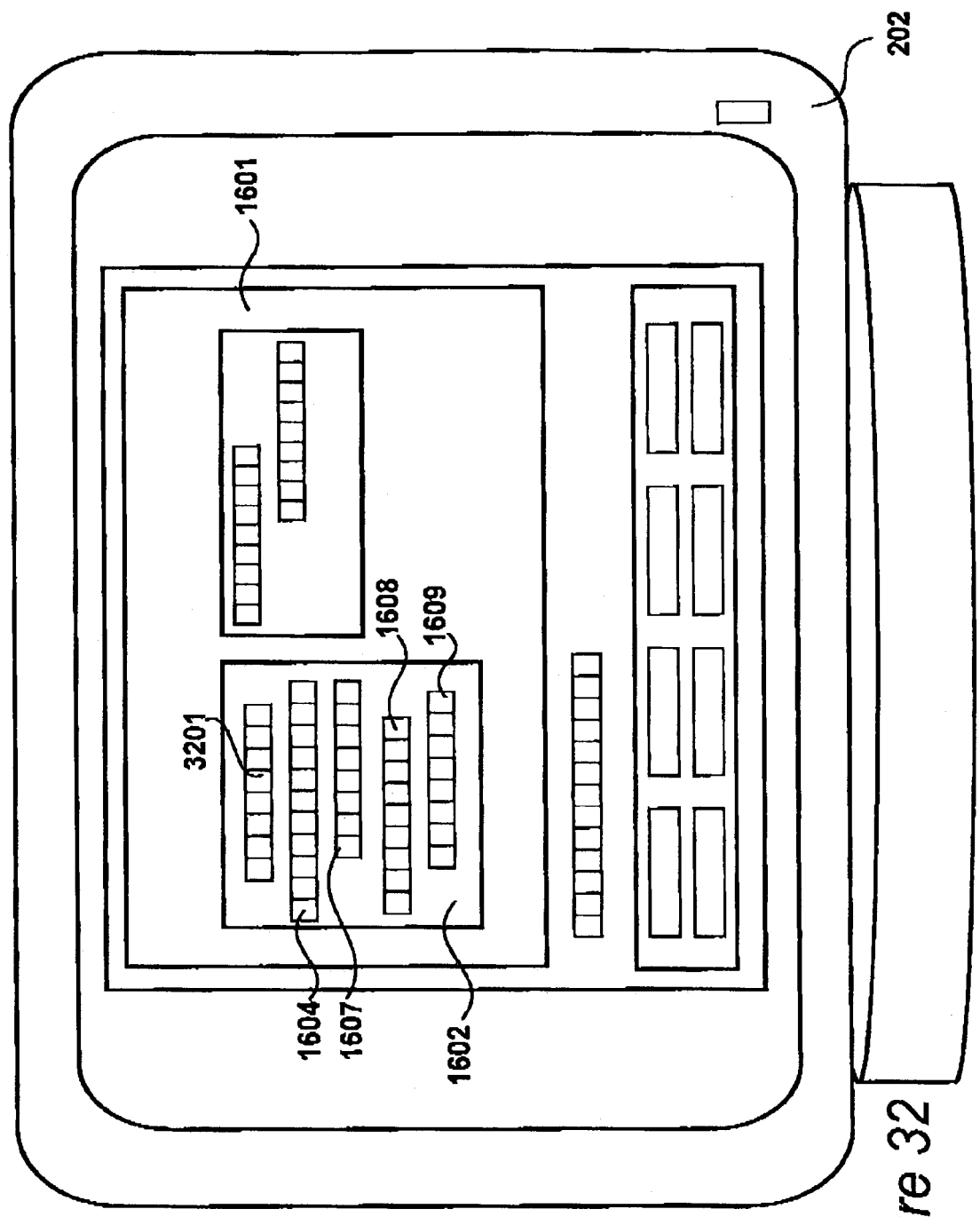
FIG. 32 illustrates the results of the function illustrated in FIG. 30 as shown on the monitor illustrated in FIG. 2.

As soon as direct write thread 1503 has written the clip of frames to framestore 106 it is available for reading by image processing systems 103 and 104, and also by PCs 101 and 102 via indirect read thread 1504. FIG. 32 shows the graphical interface illustrated in FIG. 16 displayed on monitor 202 of image processing system 103. Within reel 1602, within desktop 1601, there is now a new clip 3201. This is the clip named EFFECTS and it can now be opened by the user of image processing system 103 in the normal way.

FIG. 33

Figure 33:
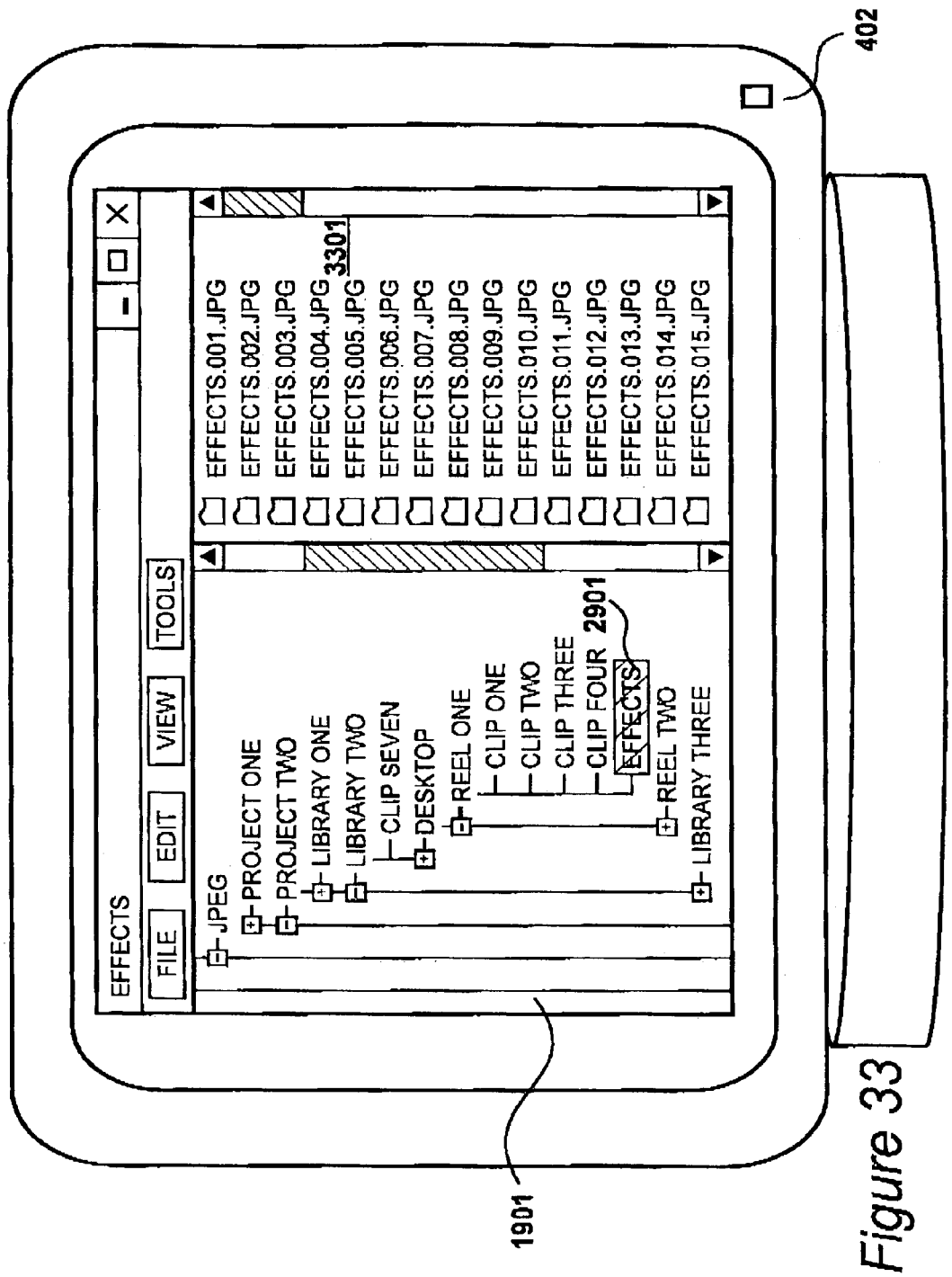
FIG. 33 illustrates the results of the function illustrated in FIG. 30 as shown on the monitor illustrated in FIG. 4.

FIG. 33 illustrates browser 1901 running on PC 101 and displayed on monitor 402. The user of PC 101 has selected EFFECTS directory 2801. This has resulted in thread 1504 examining clip 3201 and showing the frames contained therein as files, as detailed in FIG. 21. The user selected JPEG directory 1703, and so the files are currently shown as JPEG files 3301. However, these files are not files 2402 which wore saved to framestore 106, since as yet files 3301 do not exist. They would be displayed as TARGA or TIFF files if the user had instead opened directory 1704 or 1705. If the user of PC 101 reads files 3301, they will still not be the same as files 2402, since they were decompressed for storage on framestore 106 and then recompressed into the JPEG format for display at PC 101.

The invention claimed is:

1. Image processing apparatus, comprising processing means, a network interface, a buffer and frame storage means on which image data is stored as contiguous clips of frames, wherein
    (a) said network interface receives a plurality of data packets, wherein said data packets constitute a plurality of image data files to be stored in said frame storage means; and
    (b) said processing means;
        (i) stores said data packets in said buffer so as to arrange said image data files in a display-sequence order and writes said ordered image data files to said frame storage means as a contiguous clip of image frames; and
        (ii) writes said image data files to said frame storage means only when a specified period has elapsed without said network interface receiving a data packet that belongs to an image data file that is associated with a specified directory.

2. Apparatus according to claim 1, wherein an image data file that is associated with said specified file directory is defined as one that contains the name of said specified directory in its filename.

3. Apparatus according to claim 1, wherein an image data file that is associated with said specified file directory is defined as one for which said network interface has received at least on instruction that said image data file is to be written to said specified directory.

4. Apparatus according to claim 1, wherein said image data files are sequentially named in said display-sequence order.

5. Apparatus according to claim 1, wherein said processing means is configured to convert said image data files to a format suitable for storage in said frame storage means.

6. Apparatus according to claim 1, wherein said processing means is configured to assess the size of a first image data file and only store image data files that are of the same size.

7. Apparatus according to claim 1, wherein said frame storage means is implemented as an array of disks.

8. Apparatus according to claim 7, wherein said array of disks comprises at least one redundant array of inexpensive disks.

9. Apparatus according to claim 1, wherein said buffer is a portion of said frame storage means.

10. A method of writing image data files to frame storage means on which image data is stored as contiguous clips of frames, comprising the steps of:
   at a remote system, transmitting a plurality of data packets over a network in any order, wherein said data packets constitute a plurality of image data files;
   at a local system connected to said frame storage means, receiving said data packets from said remote system via said network;
   at said local system, storing said data packets in a buffer so as to arrange said image data files in a display sequence order; and
   at said local system, writing said image data files to said frame storage means as a contiguous clip of frames, wherein said local system writes said image data files stored in said buffer to said frame storage means only when a specified period has elapsed without said local system receiving over said network a data packet that belongs to an image data file that is associated with a specified directory.

11. A method according to claim 10, wherein said remote system additionally performs the step of issuing at least one instruction to write said image data files to a specified directory.

12. A method according to claim 11, wherein an image data file that is associated with said specified directory is defined as one which said remote system has instructed should be written to said specified directory.

13. A method according to claim 11, wherein said remote system issues an instruction with each data packet to write the image data file comprising said packet to said specified directory.

14. A method according to claim 13, wherein an image data file that is associated with said specified directory is defined as one which said remote system has instructed should be written to said specified directory.

15. A method according to claim 10, wherein an image data file that is associated with said specified directory is defined as one that contains the name of said specified directory in its filename.

16. A method according to claim 10, wherein said remote system additionally performs the step of issuing an instruction over said network to said local system to create said specified directory.

17. A method according to claim 10, wherein said image data files are sequentially named in said display sequence order.

18. A method according to claim 10, wherein said local system additionally performs the step of converting said image data files to a format suitable for storage in said frame storage means.

19. A method according to claim 10, wherein said local system additionally performs the step of assessing the size of one of said image data files and only storing files of the same size.

20. A method according to claim 10, wherein said buffer is a portion of said frame storage means.

21. A computer system programmed to execute stored instructions such that in response to said stored instructions said system is configured to:
   receive from a network a plurality of data packets constituting a plurality of image data files;
   store said data packets in a buffer, and
   write said image data files in display-sequence order as a contiguous dip of frames to a frame storage means connected to said computer system, wherein said image data files are written to said frame storage means only when a specified period has elapsed without said computer system receiving from said network a data packet that belongs to an image data file that is associated with a specified directory.

22. A computer system programmed to execute stored instructions according to claim 21, wherein an image data file that is associated with said specified directory is defined as one that contains the name of said specified directory in its filename.

23. A computer system programmed to execute stored instructions according to claim 21, wherein an image data file that is associated with said specified directory name is defined as one for which said comptuer system has received from said network at least one instruction that said image data file is to be written to said specified file directory.

24. A computer system programmed to execute stored instructions according to claim 21, wherein said image data files are sequentially named in said display-sequence order.

25. A computer system programmed to execute stored instructions according to claim 21, wherein said system is further configured to convert said image data files to a format suitable for storage in said frame storage means.

26. A computer system programmed to execute stored instructions according to claim 21, wherein said computer system is further configured to assess the size of one of said image data files and only store files of the same size.

27. A computer system programmed to execute stored instructions according to claim 21, wherein said frame storage means is implemented as an array of disks.

28. A computer system programmed to execute stored instructions according to claim 27, wherein said array of disks comprises at least one redundant array of inexpensive disks.

29. A computer system programmed to execute stored instructions according to claim 21, wherein said buffer is a portion of said frame storage means.

30. A computer-readable medium having computer-readable instructions executable by a computer such that, when executing said instructions, a computer will perform the steps of:
   receiving from a network a plurality of data packets consituting a plurality of image data files;
   storing said data packets in a buffer, and
   writing said image data files in display-sequence order as a contiguous clip of frames to a frame storage means connected to said computer system, wherein when executing said instructions, said computer writes said image data files to said frame storage means only when a specified period has elapsed without said computer receiving from said network a data packet that belongs to an image data file that is associated with a specified file directory.

31. A computer readable medium having computer readable instructions according to claim 30, wherein an image data file that is associated with said specified file directory is defined as one that contains the name of said specified file directory in its filename.

32. A computer readable medium having computer readable instructions according to claim 30, wherein an image data file that is associated with said specified directory name is defined as one for which said computer has received from said network at least one instruction that said image data file is to be written to said specified file directory.

33. A computer readable medium having computer readable instructions according to claim 30, wherein said image data files are sequentially named in said display-sequence order.

34. A computer readable medium having computer readable instructions according to claim 30, such that, when executing said instructions, said computer converts said image data files to a format suitable for storage in said frame storage means.

35. A computer readable medium having computer readable instructions according to claim 30, such that, when executing said instructions said computer assesses the size of one of said image data files and only stores files of the same size.

36. A computer readable medium having computer readable instructions according to claim 30, wherein said frame storage means is implemented as an array of disks.

37. A computer readable medium having computer readable instructions according to claim 36, wherein said array of disks comprises at least one redundant array of inexpensive disks.

38. A computer readable medium having computer readable instructions according to claim 30, wherein said buffer is a portion of said frame storage means.

* * * * *